United States Patent
Sakurai

(10) Patent No.: US 10,644,288 B2
(45) Date of Patent: May 5, 2020

(54) SEPARATOR-INTEGRATED ELECTRODE PLATE, ELECTRODE PLATE PAIR, STACKED ELECTRIC POWER STORAGE ELEMENT, AND METHOD OF MANUFACTURING SEPARATOR-INTEGRATED ELECTRODE PLATE

(71) Applicant: TOYOTA JIDOSHA KABUSHIKI KAISHA, Toyota-shi, Aichi-ken (JP)

(72) Inventor: Takahiro Sakurai, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 172 days.

(21) Appl. No.: 15/808,925

(22) Filed: Nov. 10, 2017

(65) Prior Publication Data

US 2018/0138482 A1 May 17, 2018

(30) Foreign Application Priority Data

Nov. 17, 2016 (JP) ................................. 2016-224477

(51) Int. Cl.
*H01M 2/16* (2006.01)
*H01M 10/04* (2006.01)
(Continued)

(52) U.S. Cl.
CPC ............. *H01M 2/16* (2013.01); *H01M 2/145* (2013.01); *H01M 2/1673* (2013.01); *H01M 2/18* (2013.01); *H01M 4/36* (2013.01); *H01M 4/64* (2013.01); *H01M 10/00* (2013.01); *H01M 10/0413* (2013.01); *H01M 10/0525* (2013.01); *H01M 10/0585* (2013.01)

(58) Field of Classification Search
CPC .. H01M 2/16; H01M 10/0413; H01M 2/1673; H01M 2/145; H01M 10/00; H01M 4/64; H01M 4/36; H01M 2/18; H01M 10/0585; H01M 10/0525
See application file for complete search history.

(56) References Cited

U.S. PATENT DOCUMENTS

| 9,548,483 B2* | 1/2017 | Umehara ................. H01M 4/13 |
| 2005/0029240 A1* | 2/2005 | Dugan ............... B23K 26/0613 |
| | | 219/121.82 |
| 2013/0309566 A1 | 11/2013 | Umehara |

FOREIGN PATENT DOCUMENTS

| JP | 2001-084985 A | 3/2001 | |
| JP | 2012-221913 | * 11/2012 | .............. H01M 4/04 |

(Continued)

OTHER PUBLICATIONS

Machine English translation of JP 2012-221913 (Year: 2012).*

*Primary Examiner* — Michael L Dignan
(74) *Attorney, Agent, or Firm* — Sughrue Mion, PLLC

(57) ABSTRACT

A separator-integrated electrode plate includes a current collector plate; an active material layer formed on the current collector plate; and a resin separator layer formed on the active material layer. A belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer.

6 Claims, 18 Drawing Sheets

(51) Int. Cl.
*H01M 2/14* (2006.01)
*H01M 2/18* (2006.01)
*H01M 4/36* (2006.01)
*H01M 4/64* (2006.01)
*H01M 10/00* (2006.01)
*H01M 10/0585* (2010.01)
*H01M 10/0525* (2010.01)

(56) References Cited

FOREIGN PATENT DOCUMENTS

| | | |
|---|---|---|
| JP | 2014-107035 A | 6/2014 |
| JP | 2015-188908 A | 11/2015 |
| KR | 10-2015-0088905 A | 8/2015 |
| WO | 2012/101816 A1 | 8/2012 |

\* cited by examiner

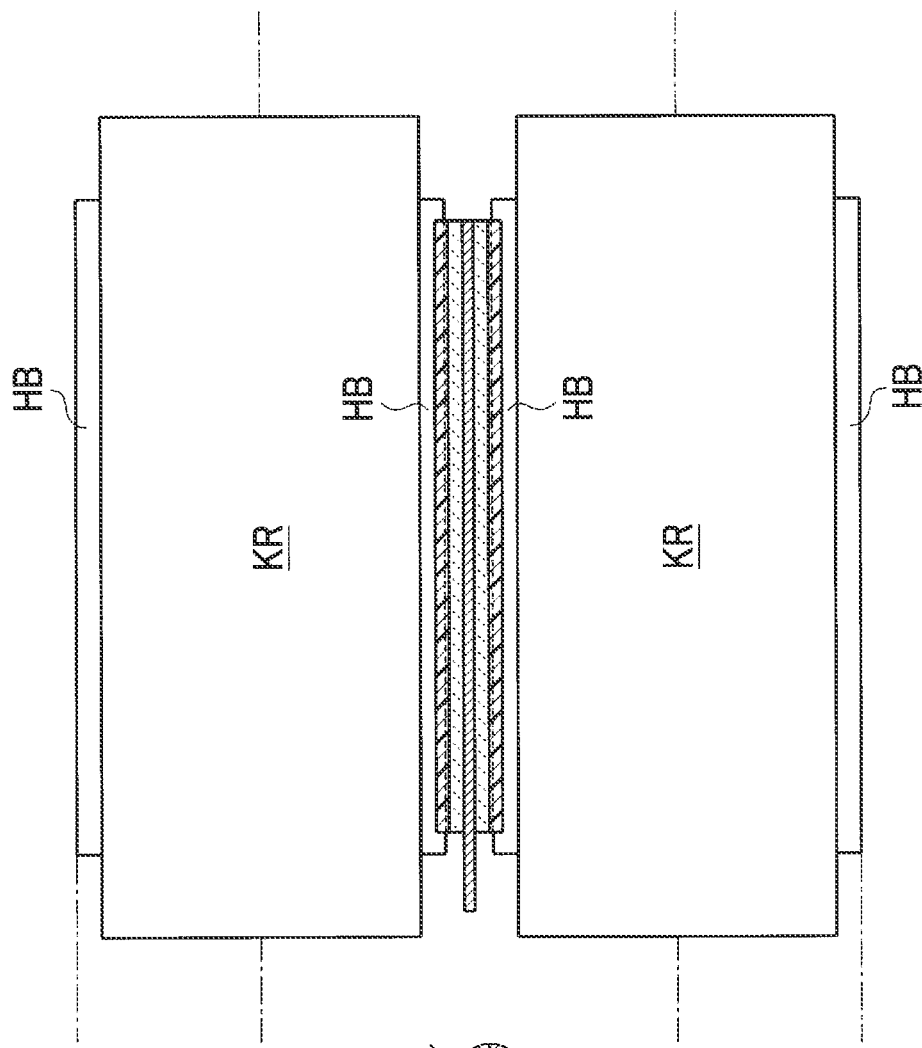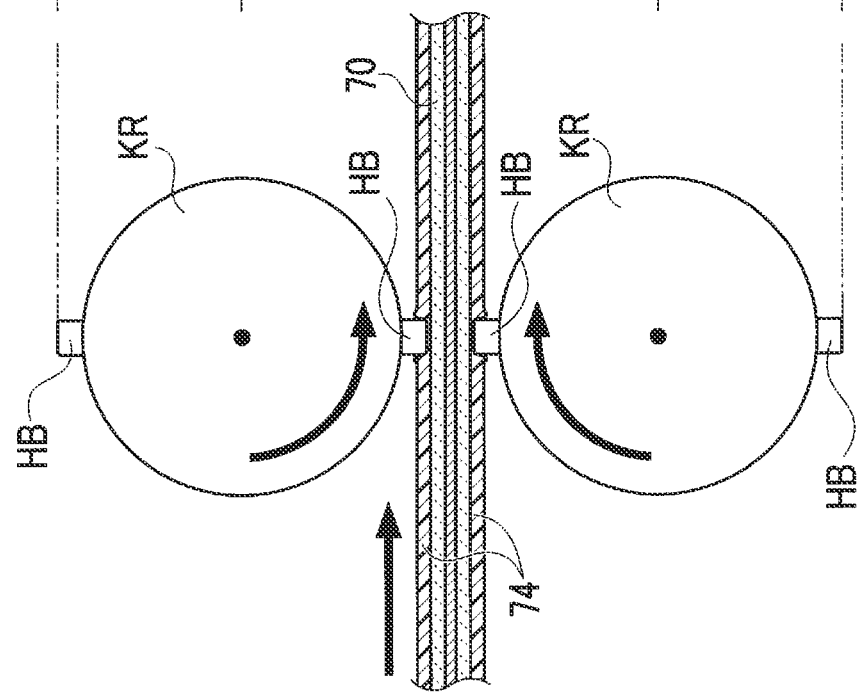

SEPARATOR-INTEGRATED ELECTRODE PLATE, ELECTRODE PLATE PAIR, STACKED ELECTRIC POWER STORAGE ELEMENT, AND METHOD OF MANUFACTURING SEPARATOR-INTEGRATED ELECTRODE PLATE

INCORPORATION BY REFERENCE

The disclosure of Japanese Patent Application No. 2016-224477 filed on Nov. 17, 2016 including the specification, drawings and abstract is incorporated herein by reference in its entirety.

BACKGROUND

1. Technical Field

The disclosure relates to a separator-integrated electrode plate in which an active material layer is provided on a current collector plate and further a separator layer is integrally provided on the active material layer, and further relates to an electrode plate pair in which a second electrode plate is stacked on the separator-integrated electrode plate, a stacked electric power storage element using electrode plate pairs, and a method of manufacturing the separator-integrated electrode plate.

2. Description of Related Art

In an electric power storage element such as a primary battery, a secondary battery, or a capacitor, an electrode assembly is formed in which a separator that allows ions to pass through is interposed between electrode plates facing each other. In this case, there is also known a separator-integrated electrode plate in which the separator is integrally formed on at least one of the electrode plates. For example, Japanese Patent Application Publication No. 2001-84985 (JP 2001-84985 A) discloses a method of manufacturing a separator-integrated negative electrode plate in which separators each in the form of a film are respectively bonded to both surfaces of a negative electrode plate via an adhesive and dried, and a method of manufacturing a stacked battery assembly in which a positive electrode plate is stacked on the separator-integrated negative electrode plate. Japanese Patent Application Publication No. 2014-107035 (JP 2014-107035 A) discloses a battery in which a separator is a separator layer coated on a main surface of at least one of a positive electrode plate and a negative electrode plate, serving as a to-be-coated electrode plate, and a battery manufacturing method in which an insulating paste obtained by dispersing thermoplastic resin particles in a solvent is coated on a main surface of a to-be-coated electrode plate and dried, thereby forming a separator layer (resin particle layer).

It is also known that a laser beam is used for cutting an electrode plate. For example, 2015-188908 (JP 2015-188908 A) discloses that when manufacturing an electrode, cutting is carried out using a laser beam, particularly using two laser beams.

SUMMARY

However, it has been found that when a separator-integrated electrode plate in which resin particles or a porous resin film is integrally provided as a resin separator layer is cut using a laser beam, when handling the electrode plate afterward, or after assembling the electrode plate into an electric power storage element, a failure tends to occur on the resin separator layer, integrated with an electrode plate, near a laser-cut edge. Specifically, for example, in a separator-integrated electrode plate SEB in which porous resin films forming resin separator layers SS are bonded to active material layers of an electrode plate, during handling such as conveyance using conveyance rollers HR, there is a case where the resin separator layer (porous resin film) SS turns up at a laser-cut edge (see FIG. 18). In a separator-integrated electrode plate having resin separator layers SS formed by depositing resin particles on active material layers of an electrode plate, there is a case where the resin particles forming the resin separator layer SS are chipped in a block-like manner near a laser-cut edge due to force, impact, or the like received during handling such as conveyance.

The disclosure provides a separator-integrated electrode plate in which a failure is unlikely to occur on a resin separator layer at a laser-cut edge although it is the separator-integrated electrode plate in which the resin separator layer is provided on an electrode plate, and further provides an electrode plate pair in which a second electrode plate is stacked on the separator-integrated electrode plate, a stacked electric power storage element using electrode plate pairs, and a method of manufacturing the separator-integrated electrode plate.

One aspect of the disclosure is a separator-integrated electrode plate including: a current collector plate; an active material layer formed on the current collector plate; and a resin separator layer formed on the active material layer, wherein a belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer.

In this electrode plate, the belt-like laser-cut end portion along the laser-cut edge includes the resin-permeated portion having the width that is more than twice the thickness of the resin separator layer. That is, the resin separator layer on the active material layer is in a firmly fixed state at the laser-cut end portion due to soaking of the resin into the active material layer over the width. Therefore, when handling the electrode plate after laser cutting, or after assembling the electrode plate into the electric power storage element, it is possible to prevent the occurrence of a failure on the resin separator layer near the laser-cut edge, for example, turning-up of the resin separator layer from the laser-cut edge or chipping of the resin separator layer in a block-like manner near the laser-cut edge.

Herein, as the separator-integrated electrode plate, not only an electrode plate having an active material layer and a resin separator layer on one surface of a current collector plate, but also an electrode plate having an active material layer and a resin separator layer on each of both surfaces of a current collector plate can be cited. As this electrode plate, a positive electrode plate having a positive electrode active material layer on a current collector plate and a negative electrode plate having a negative electrode active material layer on a current collector plate can both be employed. As an electrode plate for a bipolar battery, it may be configured such that a positive electrode active material layer is provided on one side of a current collector plate, while a negative electrode active material layer is provided on the other side of the current collector plate. When the active material layer is a negative electrode active material layer, it is possible to use, as a negative electrode active material of this negative electrode active material layer, for example, a graphite-based material such as natural graphite, spheroidized graphite, amorphous carbon-coated graphite, or artificial graphite, lithium titanate ($Li_4Ti_5O_{12}$), carbon black such as acetylene black, furnace black, or Ketjen black, carbon nanofiber, or carbon nanotube. When the active material layer is a positive electrode active material layer, it is possible to use, as a positive electrode active material of this positive electrode active material layer, for example, lithium cobaltite ($LiCoO_2$), lithium manganese oxide ($LiMn_2O_4$), or cobalt-nickel-lithium manganese oxide ($LiCO_{1/3}Ni_{1/3}Mn_{1/3}O_2$, $Li(Li_\alpha CO_x Ni_y Mn_z O_2)$).

As the resin separator layer, a porous film having a single-layer structure containing polyethylene (hereinafter also referred to as PE), polypropylene (hereinafter also referred to as PP), or the like, or having a three-layer structure of PP/PE/PP can be cited, which is bonded to the active material layer. Alternatively, a film formed by depositing resin particles containing PE, PP, ethylene-propylene copolymer resin, or the like on the active material layer can also be cited. As the resin particles, for example, polyethylene resin particles of a single type may be used, while resin particles having different particle sizes or different particle shapes may be mixed together, for example, polyethylene resin particles having different melting points may be mixed together or polyethylene resin particles and polypropylene resin particles may be mixed together, thereby forming a resin separator layer. Alternatively, a polyimide layer may be provided on the active material layer, and resin particles may be deposited on the polyimide layer, thereby providing a resin separator layer including the polyimide layer and a deposited layer of the resin particles.

The resin-permeated portion is formed such that at least part of the resin forming the resin separator layer provided on the active material layer is once melted to permeate gaps in the porous active material layer and then is solidified. The resin-permeated portion includes a state where the remaining resin adheres to an upper surface of the active material layer in the form of a film.

In this electrode plate, the width of the resin-permeated portion is set to be more than twice the thickness of the resin separator layer. If the width of the resin-permeated portion is set to be more than three times the thickness of the resin separator layer, the occurrence of a failure on the resin separator layer near the laser-cut edge can be suppressed more reliably. On the other hand, the width may be set to be less than four times the thickness. This is because as the width of the resin-permeated portion decreases, the effective area of the active material layer increases.

Further, the separator-integrated electrode plate may be configured such that the resin separator layer includes a stretched porous resin film and is bonded to the active material layer.

In this electrode plate, the stretched porous resin film is used as the resin separator layer. Therefore, compared to a separator-integrated electrode plate having a resin separator layer formed by depositing resin particles, the strength of the resin separator layer becomes higher so that the piercing strength of the electrode plate can be increased. On the other hand, when handling the electrode plate after laser cutting, a failure such that the resin separator layer (porous resin film) turns up from the laser-cut edge tends to occur. However, in this electrode plate, the resin-permeated portion is provided at the laser-cut end portion along the laser-cut edge. Therefore, a failure such that the resin separator layer (porous resin film) turns up from the laser-cut edge is unlikely to occur. In addition, since the stretched porous resin film is used as the resin separator layer, the porous resin film tends to be subjected to heat shrinkage when the heat is applied. However, in this electrode plate, since the resin separator layer is fixed to the active material layer at the resin-permeated portion, heat shrinkage of the porous resin film can be suppressed, so that the active material layer can be prevented from being exposed from the resin separator layer due to heat shrinkage thereof.

As the stretched porous resin film forming the resin separator layer, the stretched porous film having the single-layer structure containing PE, PP, or the like, or having the three-layer structure of PP/PE/PP can be cited as described above. As a method of bonding the porous resin film to the active material layer, there can be cited a method of thinly coating resin particles on the active material layer and bonding the porous resin film thereto or a method of thinly coating an adhesive on the active material layer and bonding the porous resin film thereto. As the adhesive to be used, there can be cited, for example, a resin solution in which a resin such as PVDF (polyvinylidene difluoride), PE, or PP is dissolved in a solvent such as NMP (N-methylpyrrolidone), or a resin solution in which ceramic powder such as alumina powder is further dispersed. The resin solution is used such that the solvent is dried and removed after coating and bonding.

Further, the separator-integrated electrode plate may be configured such that the active material layer and the resin separator layer are provided on each of both surfaces of the current collector plate.

In this electrode plate, the two active material layers are provided for the single current collector plate, and therefore, the current collector plate can be effectively utilized. Further, in this separator-integrated electrode plate, the resin separator layers are provided on both outer sides of the electrode plate so as to sandwich the inner current collector plate and two active material layers therebetween. Therefore, a stacked electrode assembly can be easily formed by alternately stacking the separator-integrated electrode plates and second electrode plates of opposite polarity, i.e. the second electrode plates each having second active material layers on both surfaces of a second current collector plate of opposite polarity.

Further, an electrode plate pair may include the separator-integrated electrode plate, a second current collector plate, and a pair of second active material layers respectively formed on both surfaces of the second current collector plate, wherein a second electrode plate is stacked such that one of the second active material layers is placed on one of the resin separator layers of the separator-integrated electrode plate.

The electrode plate pair includes the separator-integrated electrode plate having the active material layer and the resin separator layer on each of both surfaces of the single current collector plate, and the second electrode plate stacked on one of the resin separator layers of the separator-integrated electrode plate. Therefore, the electrode plate pair serves as a unit such that a stacked electrode assembly can be easily formed by stacking the plurality of electrode plate pairs together.

The resin separator layer of the separator-integrated electrode plate forming the electrode plate pair and the second active material layer of the second electrode plate stacked face-to-face on the resin separator layer may be fully bonded to each other using an adhesive or the like. This is because a pair of the separator-integrated electrode plate and the second electrode plate can be integrally handled as the single electrode plate pair. Specifically, in order to fully bond the separator-integrated electrode plate and the second electrode plate to each other, for example, a resin solution in which a resin such as PVDF is dissolved in a solvent such as NMP, or a resin solution in which ceramic powder such as alumina powder is further dispersed may be coated on the resin separator layer or the second active material layer, and the solvent may be dried and removed after bonding both together. The second active material layer may include a layer containing an active material and, in addition thereto, a heat-resistant layer containing ceramic powder such as alumina ceramic powder on a surface of the layer containing the active material.

Further, a stacked electric power storage element may include a stacked electrode assembly configured such that a plurality of electrode plate pairs described above are stacked together.

Since this stacked electric power storage element includes the stacked electrode assembly formed by stacking the plurality of electrode plate pairs together, it is possible to provide the electric power storage element that is simple in structure and low in cost.

As the electric power storage element, there can be cited a secondary battery such as a lithium-ion secondary battery, a capacitor, or the like.

Another aspect of the disclosure is a method of manufacturing a separator-integrated electrode plate, the separator-integrated electrode plate including: a current collector plate; an active material layer formed on the current collector plate; and a resin separator layer formed on the active material layer, wherein a belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer, the method including: a resin permeation step in which thermal energy is applied to a belt-like uncut permeation region, including a cutting planned portion in the uncut permeation region, of an uncut integrated electrode plate including an uncut current collector plate, an uncut active material layer formed on the uncut current collector plate, and an uncut resin separator layer formed on the uncut active material layer to melt an in-region portion, located in the uncut permeation region, of the uncut resin separator layer, the resin is caused to permeate an in-region active material portion, located in the uncut permeation region, of the uncut active material layer; and a post-permeation cutting step in which the cutting planned portion of the uncut integrated electrode plate is laser-cut such that the resin-permeated portion having the width is formed after laser cutting.

According to this manufacturing method, it is possible to manufacture the separator-integrated electrode plate that is provided, at the laser-cut end portion, with the wide resin-permeated portion having the width that is more than twice the thickness of the resin separator layer. That is, it is possible to reliably manufacture the separator-integrated electrode plate in which a failure such that the resin separator layer on the active material layer turns up from the laser-cut edge or is chipped near the laser-cut edge is unlikely to occur.

When the separator-integrated electrode plate having the resin separator layer on the active material layer is laser-cut, there is a case where the resin separator layer is partially burned. Even when an incombustible gas such as nitrogen or argon was supplied as an assist gas during laser cutting in order to prevent burning of the resin separator layer, there was a case where the resin separator layer was burned. This is considered to be because the resin was burned due to oxygen contained in the air accumulated between the resin separator layer and the active material layer or in gaps in the active material layer. There was a case where when the resin separator layer was burned, the resin forming the resin separator layer was carbonized, soot adhered to respective portions of the electrode plate, or the resin separator layer was partially chipped. The carbonized resin or the adhering soot is low in insulation resistance and thus decreases the insulation of the resin separator layer, so that there is a possibility of causing a micro short circuit in the battery.

In this regard, the manufacturing method of the separator-integrated electrode plate includes the resin permeation step in which the resin is caused to permeate the in-region active material portion located in the uncut permeation region before laser-cutting the cutting planned portion of the uncut integrated electrode plate in the post-permeation cutting step. The resin-permeated portion permeated with the resin has no gaps or less gaps containing air (oxygen) compared to the state before the permeation of the resin, and therefore, even when the uncut integrated negative electrode plate is laser-cut, burning of the resin permeating the resin-permeated portion is suppressed, thus preventing carbonization of the resin, chipping of the resin separator layer, adhesion of soot, and so on which are otherwise caused by burning of the resin.

As a method of applying thermal energy to the belt-like uncut permeation region of the uncut integrated electrode plate to melt the resin forming the uncut resin separator layer (in-region portion) located in the uncut permeation region, thereby causing the resin to permeate the uncut active material layer (in-region active material portion) located in the uncut permeation region, there can be cited, for example, as a non-contact method, a method of irradiating a laser beam, an infrared beam, a microwave, or the like from a $CO_2$ laser or the like to the resin forming the uncut resin separator layer (in-region portion) to melt the resin, thereby causing the resin to permeate the uncut active material layer. There can also be cited a method of irradiating a laser beam of a fiber laser or the like which is not absorbed by the resin, but absorbed by the active material layer, to heat the uncut active material layer (in-region active material portion), thereby indirectly melting the resin forming the uncut resin separator layer (in-region portion) to cause the resin to permeate the uncut active material layer. There can also be cited a method of pressing a heating body, heated to equal to or higher than a melting point of the resin, against the uncut resin separator layer to melt the resin, thereby causing the resin to permeate the uncut active material layer. As a laser for laser-cutting the uncut integrated electrode plate, it is preferable to use a fiber laser, a YAG laser, or the like which is excellent in processing the active material layer and the current collector plate.

In addition, in the case where the resin separator layer is the stretched porous resin film bonded to the active material layer in the manufactured separator-integrated electrode plate, since an end portion of the resin separator layer is fixed to the resin-permeated portion, it can be advantageously prevented that the resin film forming the resin separator layer is subjected to heat shrinkage when the heat is applied.

Further, the manufacturing method of the separator-integrated electrode plate may be configured such that when causing the resin to permeate the in-region active material portion located in the uncut permeation region in the resin permeation step, a heating body heated to equal to or higher than a melting point of the resin is pressed against the uncut permeation region of the uncut integrated electrode plate, the resin forming the in-region portion of the uncut resin separator layer is melted to cause the resin to permeate the in-region active material portion.

In this manufacturing method, since the heating body is used for melting the resin, the resin forming the uncut resin separator layer can be melted in a short time and easily. In addition, since the heating body is pressed against the uncut permeation region, the molten resin can be reliably caused to permeate the uncut active material layer.

Alternatively, the manufacturing method of the separator-integrated electrode plate may be configured such that when causing the resin to permeate the in-region active material portion located in the uncut permeation region in the resin permeation step, a melting laser beam is irradiated to the uncut permeation region of the uncut integrated electrode plate, the resin forming the in-region portion of the uncut resin separator layer is melted to cause the resin to permeate the in-region active material portion.

Since the melting laser beam is used for melting the resin forming the in-region portion of the uncut resin separator layer, the resin can be melted in a non-contact manner with respect to the uncut resin separator layer, and further, the molten resin can be reliably caused to permeate the in-region active material portion.

As the melting laser beam for melting the resin, there can be cited, for example, a $CO_2$ laser that emits an infrared beam (wavelength 10.6 μm) which is efficiently absorbed by the resin.

Another aspect of the disclosure is a method of manufacturing a separator-integrated electrode plate, the separator-integrated electrode plate including: a current collector plate; an active material layer formed on the current collector plate; and a resin separator layer formed on the active material layer, wherein a belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer, the method including: a permeation cutting step in which thermal energy is applied to a belt-like uncut permeation region, including a cutting planned portion in the uncut permeation region, of an uncut integrated electrode plate including an uncut current collector plate, an uncut active material layer formed on the uncut current collector plate, and an uncut resin separator layer formed on the uncut active material layer to melt an in-region portion, located in the uncut permeation region, of the uncut resin separator layer, the resin is caused to permeate an in-region active material portion, located in the uncut permeation region, of the uncut active material layer; and simultaneously, laser-cutting the cutting planned portion of the uncut integrated electrode plate such that the resin-permeated portion having the width is formed after laser cutting.

According to this manufacturing method, it is possible to manufacture the separator-integrated electrode plate that is provided, at the laser-cut end portion, with the wide resin-permeated portion having the width that is more than twice the thickness of the resin separator layer. That is, it is possible to reliably manufacture the separator-integrated electrode plate in which a failure such that the resin separator layer on the active material layer turns up from the laser-cut edge or is chipped near the laser-cut edge is unlikely to occur.

Further, in this manufacturing method, when laser-cutting the cutting planned portion of the uncut integrated electrode plate in the permeation cutting step, the resin forming the in-region portion of the uncut resin separator layer is melted to permeate the in-region active material portion of the uncut active material layer, and simultaneously, the uncut integrated electrode plate is cut, so that the process can be completed in a short time.

As a method of melting the resin to cause the resin to permeate the in-region active material portion of the uncut active material layer and simultaneously cutting the uncut integrated electrode plate, there can be cited a method of, for example, splitting a laser beam of a fiber laser into a laser beam for resin melting and a laser beam for electrode plate cutting using a beam splitter, heating the uncut active material layer using the laser beam for resin melting to melt the resin of the in-region portion by that heat, thereby causing the resin to permeate the in-region active material portion of the uncut active material layer, and cutting the uncut integrated electrode plate using the laser beam for electrode plate cutting. There can also be cited a method of melting the resin of the in-region portion using a laser beam of a $CO_2$ laser for resin melting, thereby causing the resin to permeate the in-region active material portion of the uncut active material layer, and cutting the uncut integrated electrode plate using a laser beam of a fiber laser for electrode plate cutting. It is possible to combine melting of the resin of the in-region portion by contact of a heating body or irradiation of an infrared beam and cutting of the uncut integrated electrode plate using a laser beam for electrode plate cutting.

Another aspect of the disclosure is a method of manufacturing a separator-integrated electrode plate, the separator-integrated electrode plate including: a current collector plate; an active material layer formed on the current collector plate; and a resin separator layer formed on the active material layer, wherein a belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer, the method including: a before-permeation cutting step in which an uncut integrated electrode plate including an uncut current collector plate, an uncut active material layer formed on the uncut current collector plate, and an uncut resin separator layer formed on the uncut active material layer is laser-cut; and a post-cutting permeation in which thermal energy is applied to the laser-cut end portion to melt the resin forming the resin separator layer, the resin is caused to permeate the active material layer, such that the resin-permeated portion having the width is formed along the laser-cut edge generated by the laser cutting.

According to this manufacturing method, it is possible to manufacture the separator-integrated electrode plate that is provided, at the laser-cut end portion, with the wide resin-permeated portion having the width that is more than twice the thickness of the resin separator layer. That is, it is possible to reliably manufacture the separator-integrated electrode plate in which a failure such that the resin separator layer on the active material layer turns up from the laser-cut edge or is chipped near the laser-cut edge is unlikely to occur.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12A is an explanatory diagram showing a state where resins of the uncut resin separator layers are melted by pressing hot plates of rollers, thereby causing the resins to permeate uncut active material layers, and is a sectional view in a longitudinal direction of the separator-integrated negative electrode plate, according to the embodiment;

FIG. 12B is an explanatory diagram showing a state where resins of the uncut resin separator layers are melted by pressing hot plates of rollers, thereby causing the resins to permeate uncut active material layers, and is a sectional view in a lateral direction of the separator-integrated negative electrode plate, according to the embodiment;

DETAILED DESCRIPTION OF EMBODIMENTS

Embodiment

Figure 1:
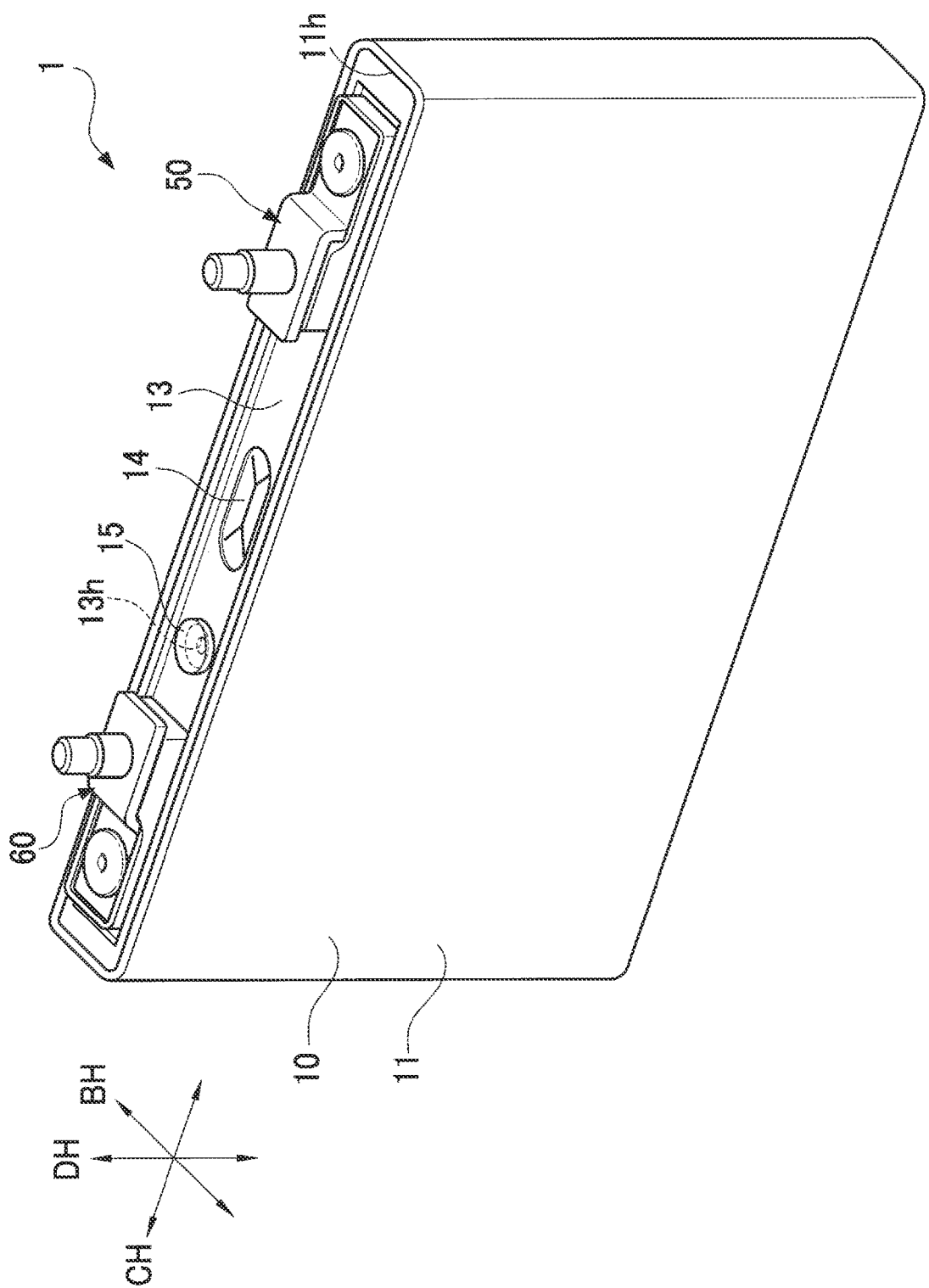
FIG. 1 is a perspective view of a lithium-ion secondary battery according to an embodiment and modifications.
Figure 2:
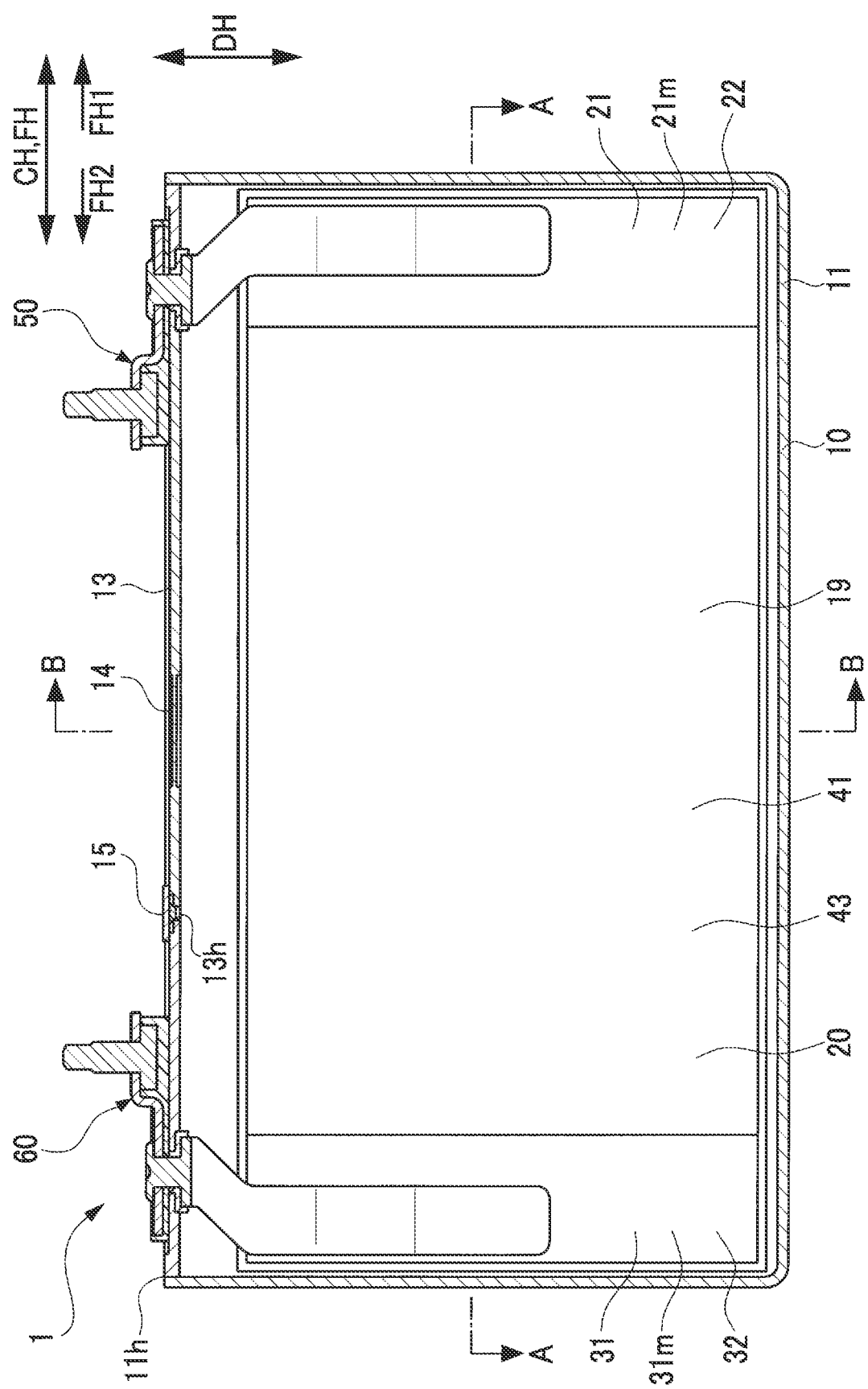
FIG. 2 is a longitudinal sectional view of the lithium-ion secondary battery according to the embodiment and the modifications.
Figure 3:
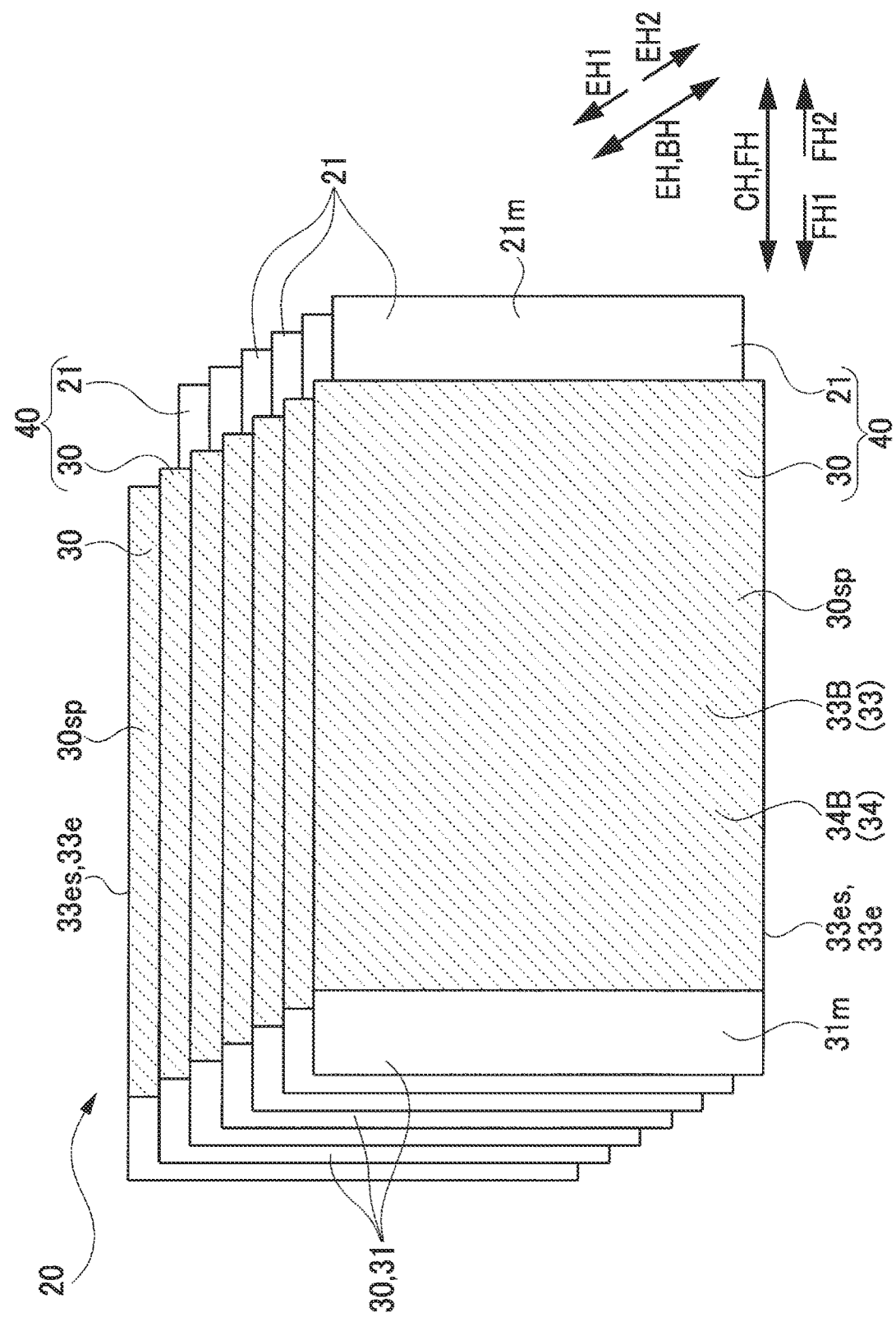
FIG. 3 is an explanatory diagram showing a stacked state of positive electrode plates and negative electrode plates in an electrode assembly according to the embodiment and the modifications.
Figure 4:
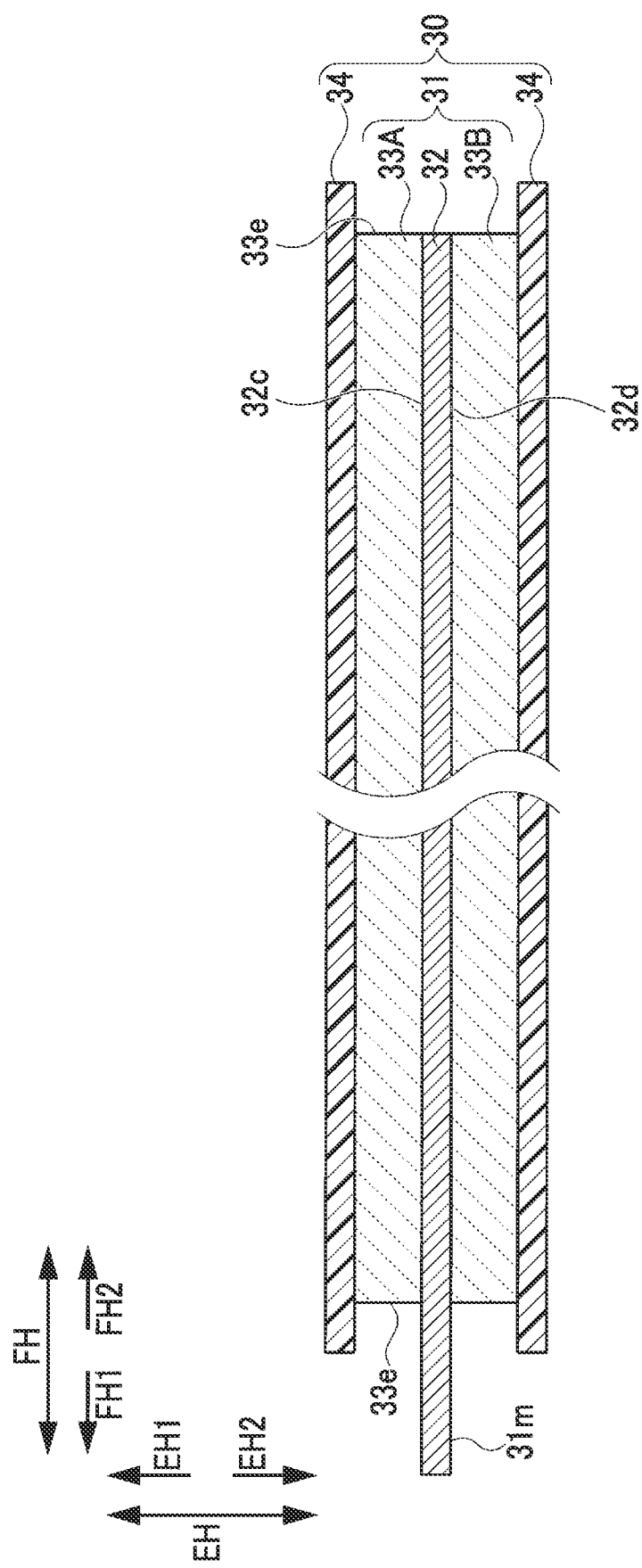
FIG. 4 is an A-A sectional view of a separator-integrated negative electrode plate in FIG. 2 according to the embodiment.
Figure 5:
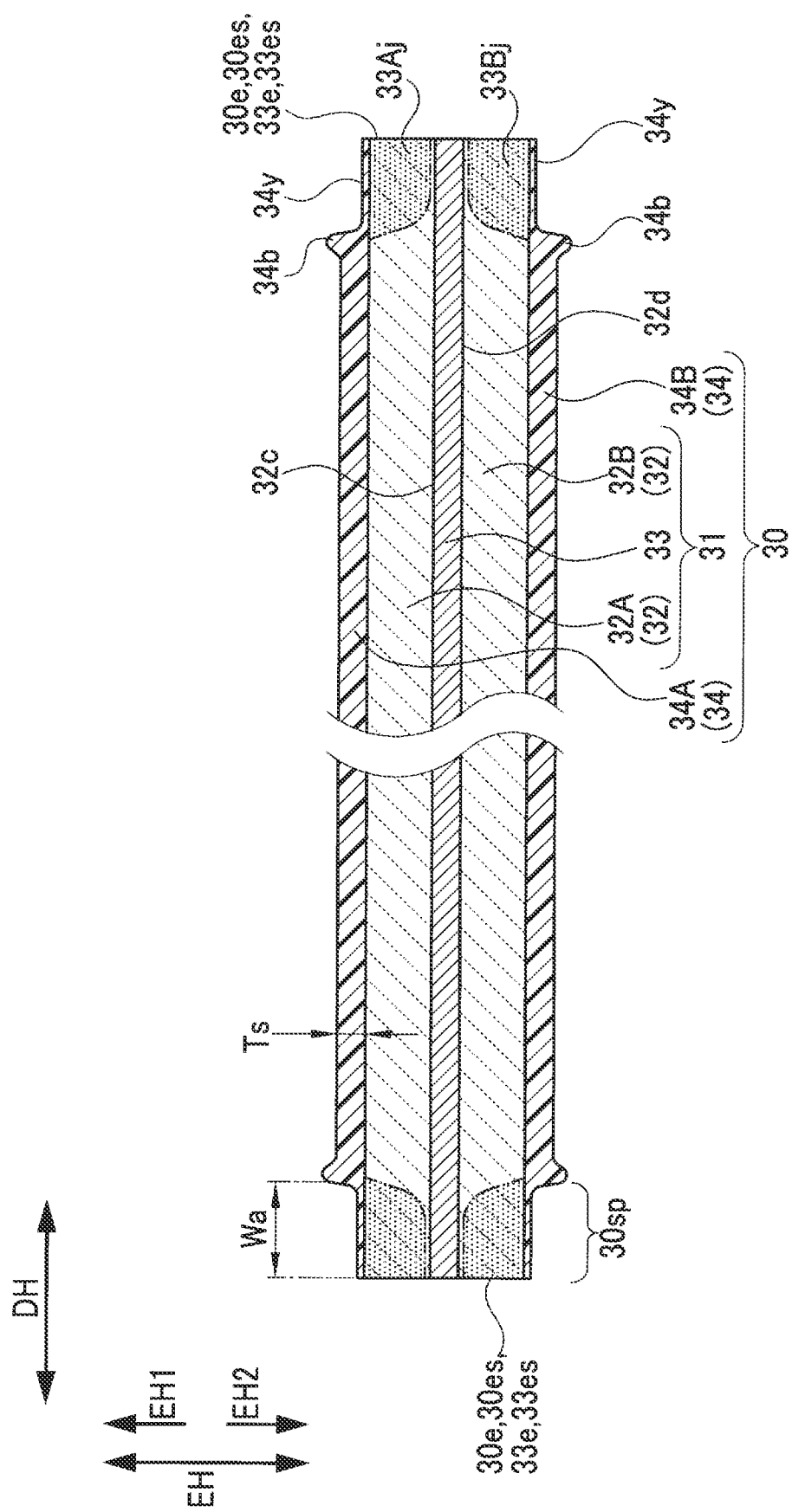
FIG. 5 is a B-B sectional view of the separator-integrated negative electrode plate in FIG. 2 according to the embodiment.

Hereinbelow, an embodiment of the disclosure will be described with reference to the drawings. FIG. 1 is a perspective view of a lithium-ion secondary battery (hereinafter also referred to simply as a "battery") 1 according to this embodiment. FIG. 2 is a longitudinal sectional view of the battery 1. FIG. 3 shows a stacked state of positive electrode plates 21 and negative electrode plates 31 in an electrode assembly 20 housed in the battery 1. FIG. 4 shows a sectional structure of the negative electrode plate 31 taken along an A-A section in FIG. 2 according to this embodiment. FIG. 5 shows a sectional structure of the negative electrode plate 31 taken along a B-B section in FIG. 2 according to this embodiment. Hereinbelow, with respect to the battery 1, a battery thickness direction BH, a battery width direction CH, a battery height direction DH, a stacking direction (a thickness direction of the negative electrode plate 31) EH, one side EH1, the other side EH2, an electrode extraction direction FH, a first side FH1, and a second side FH2 are defined as shown in FIGS. 1 to 3. In an assembled state of the battery 1, the stacking direction EH corresponds to the battery thickness direction BH, while the electrode extraction direction FH corresponds to the battery width direction CH.

The battery 1 is a prismatic sealed lithium-ion secondary battery that is installed in a vehicle such as a hybrid vehicle, a plug-in hybrid vehicle, or an electric vehicle. The battery 1 includes a battery case 10, the stacked electrode assembly 20 housed in the battery case 10, a positive electrode terminal member 50 and a negative electrode terminal member 60 supported by the battery case 10, and so on (see FIG. 2). In the battery case 10, a nonaqueous electrolyte solution 19 is stored and is partially impregnated into the electrode assembly 20.

The battery case 10 has a rectangular box shape and is made of a metal (aluminum in this embodiment). The battery case 10 includes a case body member 11 having a bottomed rectangular box shape with an opening only on its upper side, and a case lid member 13 having a rectangular plate shape and welded to close the opening of the case body member 11. The positive electrode terminal member 50 made of aluminum is fixed to the case lid member 13 while being insulated from the case lid member 13. The positive electrode terminal member 50 bundles and connects together positive electrode current collecting portions 21*m* of the positive electrode plates 21 of the stacked electrode assembly 20 in the battery case 10 and extends to the battery outside through the case lid member 13. The negative electrode terminal member 60 made of copper is fixed to the case lid member 13 while being insulated from the case lid member 13. The negative electrode terminal member 60 bundles and connects together negative electrode current collecting portions 31*m* of the negative electrode plates 31 of the electrode assembly 20 in the battery case 10 and extends to the battery outside through the case lid member 13.

The electrode assembly 20 (see FIGS. 2 and 3) has a generally rectangular parallelepiped shape and is housed in the battery case 10 in such a way that the stacking direction EH of the positive electrode plates 21 and the negative electrode plates 31 coincides with the battery thickness direction BH and that the electrode extraction direction FH coincides with the battery width direction CH. The electrode assembly 20 are formed by alternately stacking the rectangular positive electrode plates 21 and the rectangular negative electrode plates 31 in the stacking direction EH with separator layers 34 respectively interposed therebetween. At each of both ends in the stacking direction EH, the separator layer 34 is disposed, and on its inner side, the negative electrode plate 31 is disposed. In this embodiment, actually, as will be described later, a plurality of electrode plate pairs 40 each formed such that an integrated negative electrode plate 30 including the negative electrode plate 31 and the separator layers 34 and the positive electrode plate 21 are integrally stacked are stacked on one another and further that an integrated negative electrode plate 30 is stacked from the one side EH1 are stacked on one another.

Each positive electrode plate 21 (see FIGS. 6 and 7) is formed such that positive electrode active material layers 23 (one-side positive electrode active material layer 23A and the other-side positive electrode active material layer 23B) having a rectangular shape are each provided on part, on the first side FH1 in the electrode extraction direction FH (i.e. on the left side in FIG. 3), of a corresponding one of both surfaces (one-side surface 22*c* and the other-side surface 22*d*) of a positive electrode current collector foil 22 including a rectangular aluminum foil. A portion, on the second side FH2 (i.e. on the right side in FIG. 3), of the positive electrode current collector foil 22 of each positive electrode plate 21 is provided with no positive electrode active material layer 23 on its either side and serves as the positive electrode current collecting portion 21*m* where the positive electrode current collector foil 22 is exposed. The positive electrode current collecting portions 21*m* of the positive electrode plates 21 are bundled together in the stacking direction EH and welded to the positive electrode terminal member 50.

The positive electrode current collector foil 22 used in the positive electrode plate 21 is a rolled aluminum foil having a thickness of 6 to 25 μm (specifically, 10 μm in this embodiment). The positive electrode active material layer 23 has a thickness of, for example, 10 to 80 μm (specifically, 60 μm in this embodiment). As a positive electrode active material for the lithium-ion secondary battery, a material that can absorb and release Li$^+$ ions, for example, $LiCoO_2$, $LiMnO_4$, $LiNi_xMn_yCo_zO_2$, $LiNi_xCo_yAl_zO_2$, or $LiFePO_4$, can be cited by way of example. In this embodiment, $LiNi_{1/3}Mn_{1/3}Co_{1/3}O_2$ is used as the positive electrode active material, and the positive electrode active material layer 23 contains, in addition to the positive electrode active material, acetylene black as a conductive material and PVDF as a binder.

Next, the integrated negative electrode plate 30 (see FIGS. 4 and 5) as a separator-integrated electrode plate according to this embodiment will be described. The integrated negative electrode plate 30 is formed such that the separator layers 34, 34 are respectively provided on both surfaces of the negative electrode plate 31.

The negative electrode plate 31 is formed such that negative electrode active material layers 33 (one-side negative electrode active material layer 33A and the other-side negative electrode active material layer 33B) having a rectangular shape are respectively provided on both surfaces (one-side surface 32*c* and the other-side surface 32*d*) on the second side FH2 (i.e. on the right side in FIG. 4) of a negative electrode current collector foil 32 including a rectangular copper foil. A portion, on the first side FH1 (i.e. on the left side in FIG. 4), of the negative electrode current collector foil 32 of the negative electrode plate 31 is provided with no negative electrode active material layer 33 on its either side and serves as the negative electrode current collecting portion 31*m* where the negative electrode current collector foil 32 is exposed. The negative electrode current collecting portions 31*m* of the negative electrode plates 31 are bundled together in the stacking direction EH and welded to the negative electrode terminal member 60.

The one-side separator layer 34A is disposed on the one-side negative electrode active material layer 33A (on the one side EH1 in the stacking direction EH) of the negative electrode plate 31, while the other-side separator layer 34B is disposed on the other-side negative electrode active material layer 33B (on the other side EH2 in the stacking direction EH) of the negative electrode plate 31, so that the integrated negative electrode plate 30 is formed.

The negative electrode current collector foil 32 used in the negative electrode plate 31 is a copper foil having a thickness of 6 to 20 μm (specifically, 10 μm in this embodiment). The negative electrode active material layer 33 has a thickness of, for example, 10 to 80 μm (specifically, 20 μm in this embodiment). As a negative electrode active material for the lithium-ion secondary battery, a material that can absorb and release $Li^+$ ions, for example, graphite particles such as natural graphite, spheroidized graphite, amorphous carbon-coated graphite, or artificial graphite, hard carbon, soft carbon, $Li_4Ti_5O_{12}$, $Li_{4.4}Si$, or $Li_{4.4}Ge$, can be cited by way of example. In this embodiment, the negative electrode active material layer 33 contains, in addition to the natural graphite, acetylene black as a conductive material and CMC as a binder.

In this embodiment, the separator layers 34 (34A, 34B) each include a porous film having a three-layer structure of PP/PE/PP and stretched in the stretching direction. Alternatively, use may be made of a PE single-layer porous film. Alternatively, a separator layer may be formed by depositing resin particles containing PE etc. on the negative electrode active material layer 33.

When an electric power storage element such as a lithium-ion secondary battery is formed using the negative electrode plate 31, the separator layers 34 (34A, 34B) each function as a separator which allows ions such as $Li^+$ ions in the electrolyte solution to pass through. As shown in FIG. 4, the separator layers 34 (34A, 34B) are each formed to be larger than the negative electrode active material layer 33 in the electrode extraction direction FH such that the separator layers 34 (34A, 34B) each protrude from active material layer peripheral edges 33e in the electrode extraction direction FH.

On the other hand, as shown in FIG. 5, with respect to the battery height direction DH, the separator layers 34 (34A, 34B) are each formed to be equal in size to the negative electrode active material layer 33 such that the separator layers 34 (34A, 34B) each do not protrude from either of active material layer peripheral edges 33e (active material layer laser-cut edges 33es). That is, in the integrated negative electrode plate 30, the resins (PE, PP) forming the separator layers 34 permeate the one-side negative electrode active material layer 33A and the other-side negative electrode active material layer 33B to form resin-permeated portions 33Aj and 33Bj at laser-cut end portions 30sp that are belt-like regions along laser-cut edges 30es (left and right edges in FIG. 5), formed by later-described laser cutting, of peripheral edges 30e of the integrated negative electrode plate 30. At the laser-cut end portions 30sp, the molten resins (a mixture of PE and PP) partially remain in the form of a film on the resin-permeated portions 33Aj and 33Bj. A width Wa of the resin-permeated portions 33Aj and 33Bj is set to be more than twice a thickness Ts of the separator layer 34 (Wa>2·TS). As will be described later (see FIGS. 11A, 11B, 11C and FIGS. 12A, 12B), since the resin-permeated portions 33Aj and 33Bj are formed by pressing hot plates HB against the separator layers 34, a portion, adjacent to the laser-cut end portion 30sp, of each separator layer 34 is in the form of a protruding bulged portion 34b.

In the integrated negative electrode plate 30, as described above, the resin-permeated portions 33Aj and 33Bj each having the width Wa that is more than twice the thickness Ts of the separator layer 34 are provided at the belt-like laser-cut end portions 30sp along the laser-cut edges 30es. That is, the separator layers 34A and 34B on the negative electrode active material layers 33A and 33B are in a firmly fixed state at the laser-cut end portions 30sp due to soaking of the resins into the negative electrode active material layers 33A and 33B over the width Wa. Therefore, when handling the integrated negative electrode plate 30 after laser cutting, or after assembling the integrated negative electrode plate 30 into the battery 1, it is possible to prevent the occurrence of a failure at the laser-cut end portion 30sp, for example, turning-up of the separator layer 34 from the laser-cut edge 30es.

In the integrated negative electrode plate 30, the stretched porous resin film is used as the separator layer 34. Therefore, compared to the separator layer formed by depositing the resin particles, the stretched porous resin film is preferable in that the strength of the separator layer becomes higher. Further, in the integrated negative electrode plate 30, the resin-permeated portions 33Aj and 33Bj are provided at the laser-cut end portions 30sp along the laser-cut edges 30es. Therefore, as described above, such a failure that the separator layer 34 (porous resin film) turns up from the laser-cut edge 30es is unlikely to occur. In addition, in the integrated negative electrode plate 30, since the separator layers 34 are respectively fixed to the negative electrode active material layers 33A and 33B at the resin-permeated portions 33Aj and 33Bj, heat shrinkage of the separator layers 34 (porous resin films) can be suppressed, so that the negative electrode active material layers 33A and 33B can be prevented from being exposed from the separator layers 34A and 34B due to heat shrinkage thereof.

Moreover, in the integrated negative electrode plate 30, the two negative electrode active material layers 33A and 33B are provided for the single negative electrode current collector foil 32, and therefore, the negative electrode current collector foil 32 can be effectively utilized. Further, in the integrated negative electrode plate 30, the separator layers 34 are provided on both outer sides of the negative electrode plate 31 so as to sandwich the inner negative electrode current collector foil 32 and two negative electrode active material layers 33A and 33B therebetween. Therefore, the stacked electrode assembly 20 can be easily formed by alternately stacking the integrated negative electrode plates 30 and the positive electrode plates 21 of opposite polarity, i.e. the positive electrode plates 21 each having the positive electrode active material layers 23, 23 on both surfaces of the positive electrode current collector foil 22.

Figure 6:
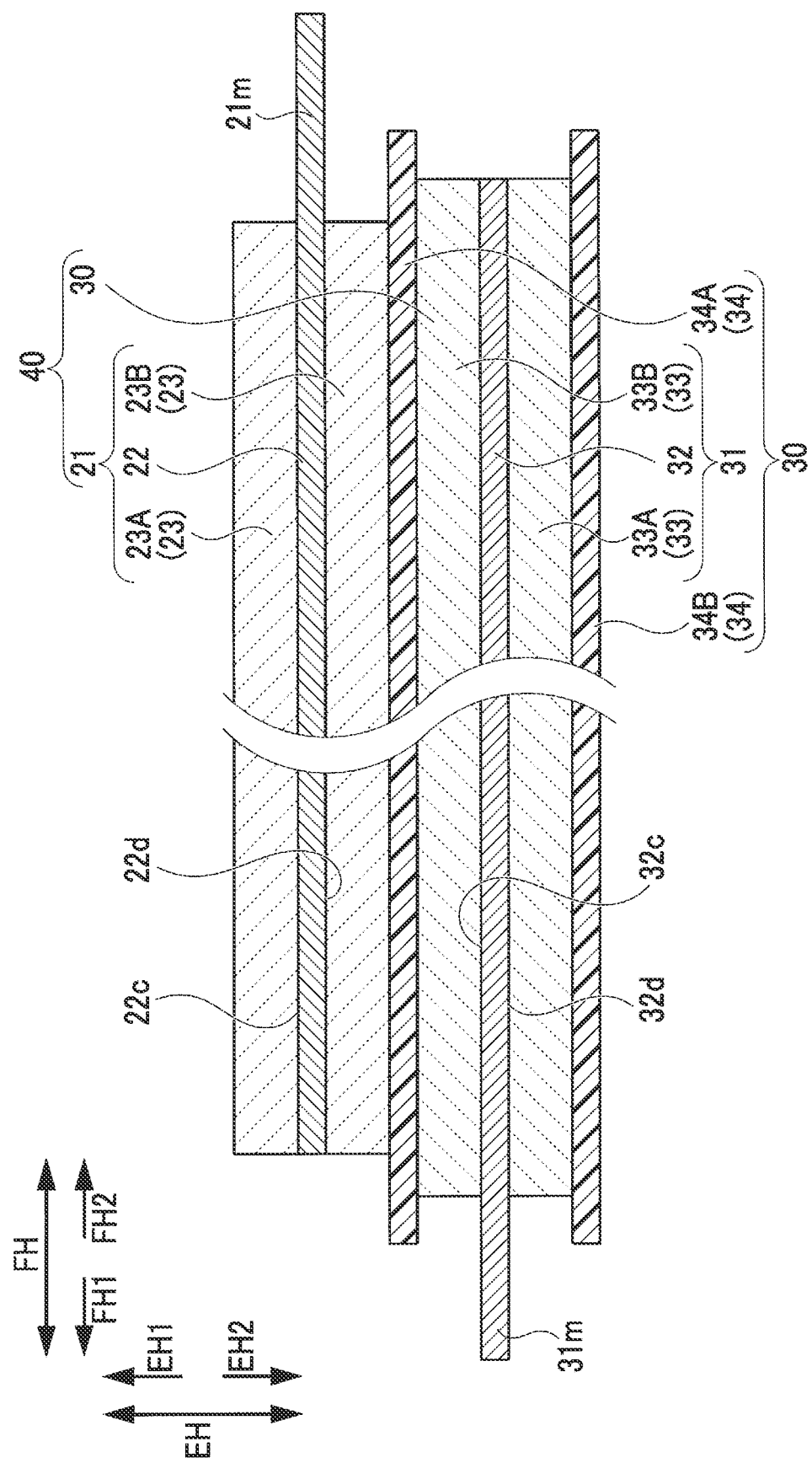
FIG. 6 is an A-A sectional view of an electrode plate pair in FIG. 2 according to the embodiment.
Figure 7:
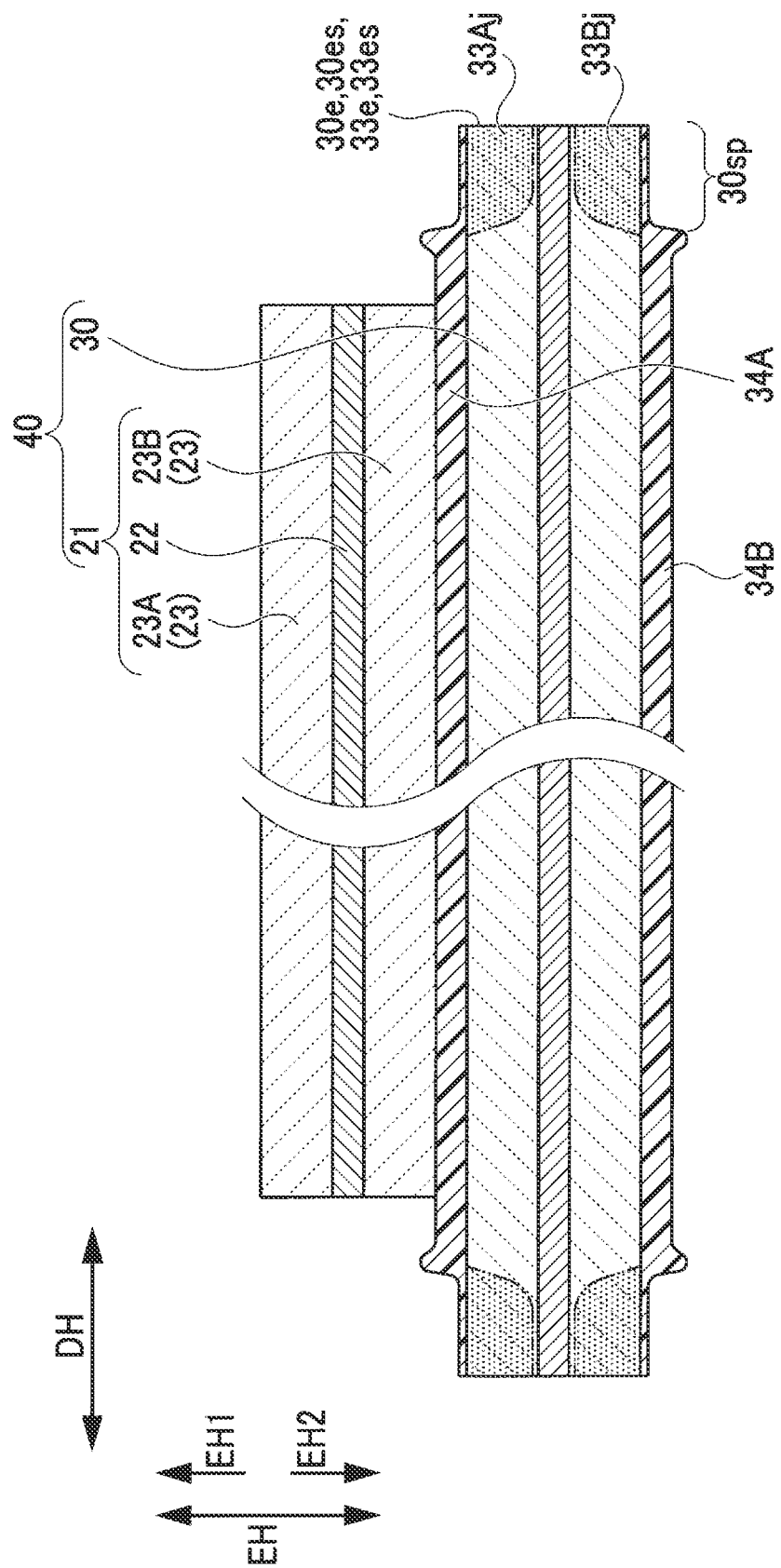
FIG. 7 is a B-B sectional view of the electrode plate pair in FIG. 2 according to the embodiment.

Further, in this embodiment, prior to manufacturing the electrode assembly 20 and the battery 1 as will be described later, the electrode plate pair 40 shown in FIGS. 6 and 7 is formed using the integrated negative electrode plate 30 and the positive electrode plate 21. The electrode plate pair 40 is formed in such a way that the other-side positive electrode active material layer 23B of the positive electrode plate 21 is placed on the one-side separator layer 34A of the integrated negative electrode plate 30 and that both are bonded to each other.

Figure 8:
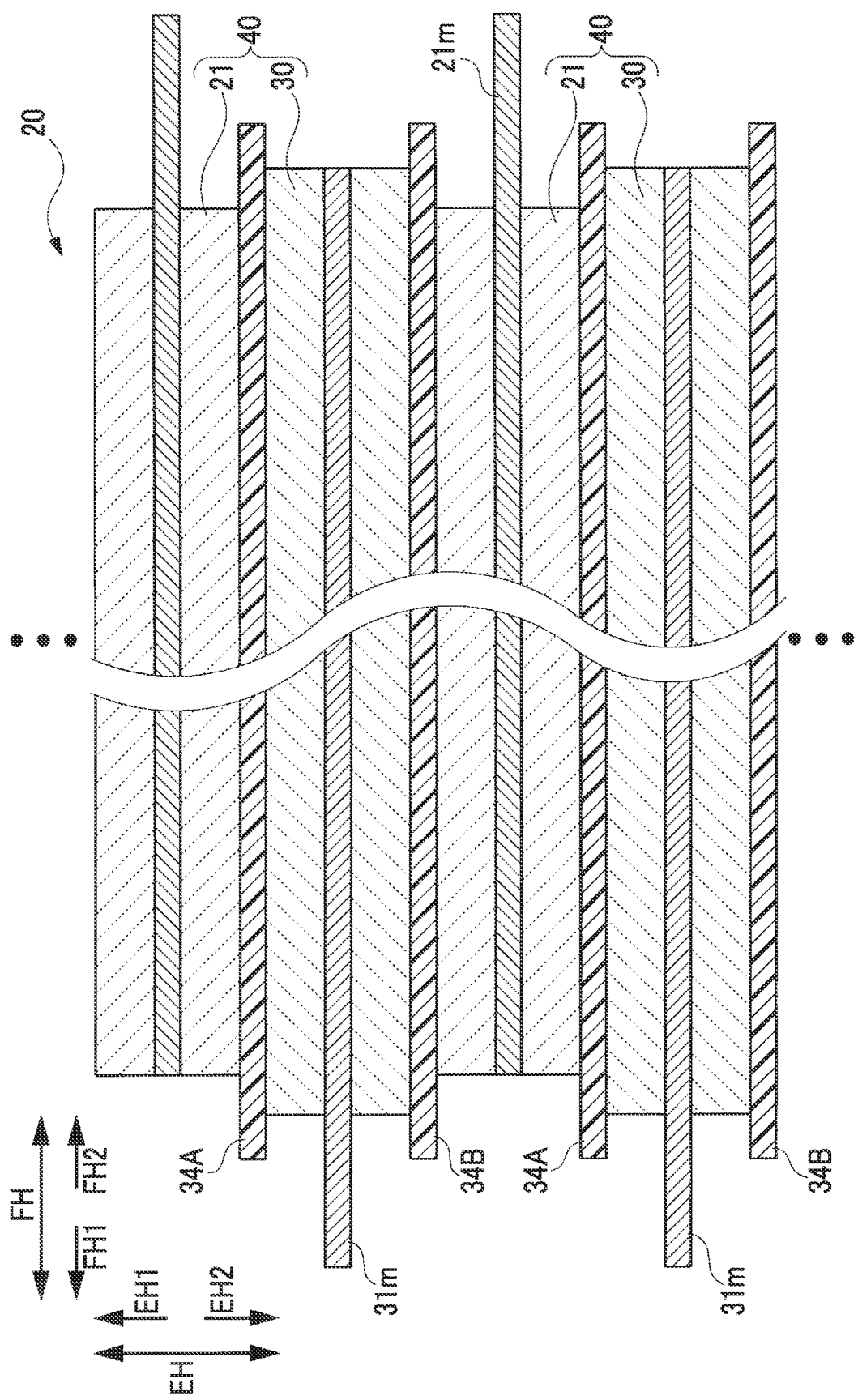
FIG. 8 is an A-A sectional view of an electrode assembly in FIG. 2 according to the embodiment.
Figure 9:
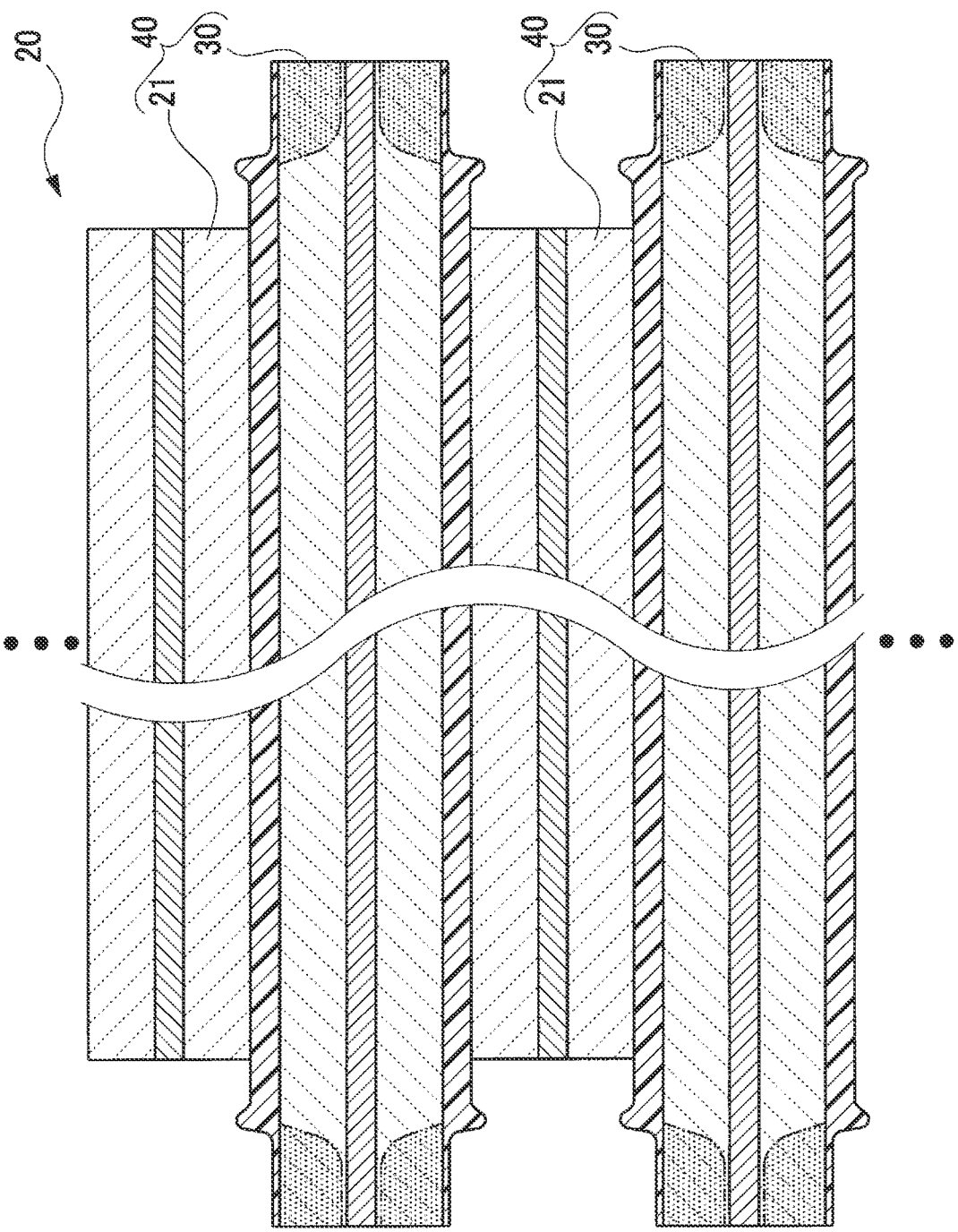
FIG. 9 is a B-B sectional view of the electrode assembly in FIG. 2 according to the embodiment.
Figure 10:
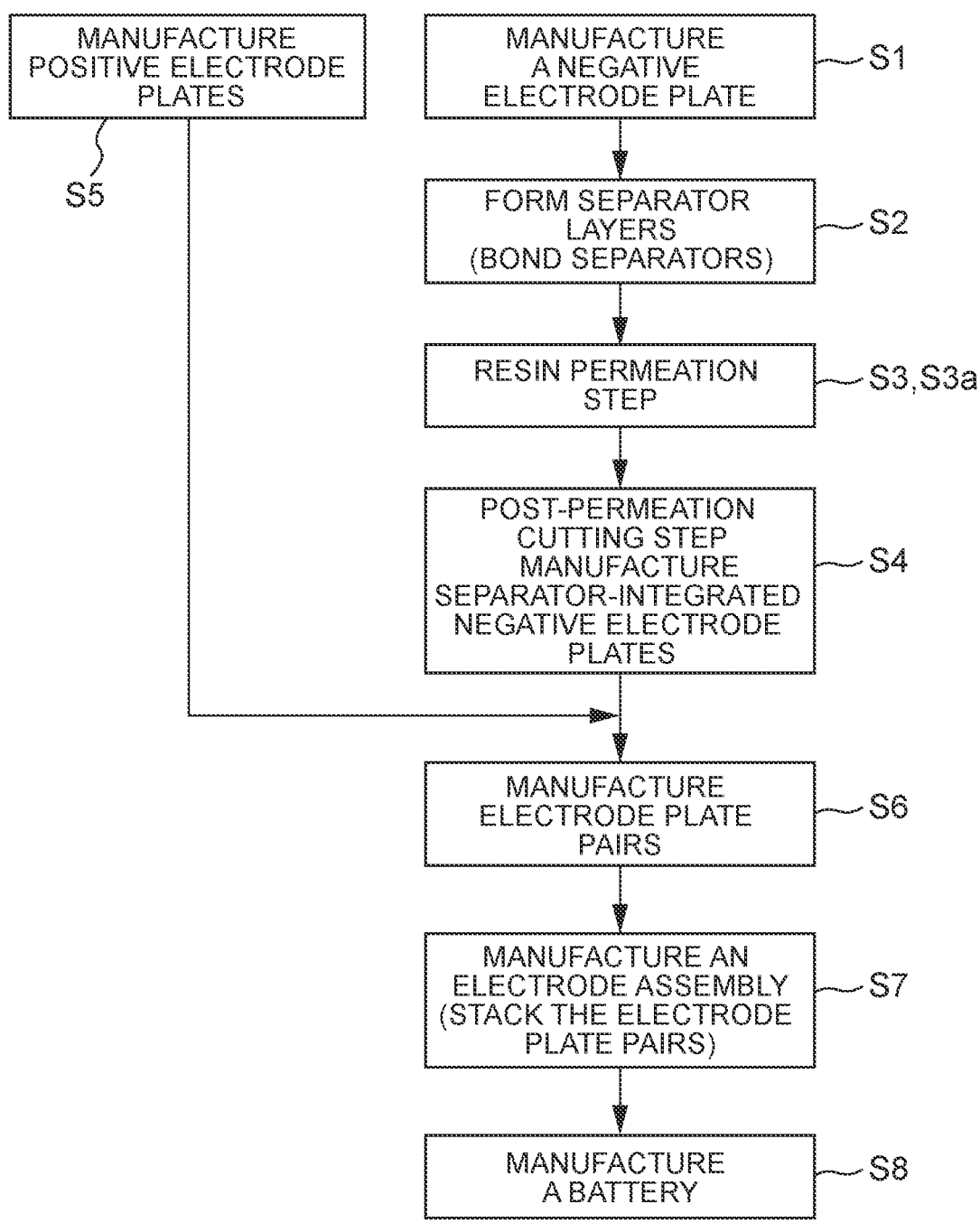
FIG. 10 is a flowchart showing manufacturing processes of the separator-integrated negative electrode plate, the electrode plate pair, and the battery according to the embodiment.

The electrode plate pair 40 includes the integrated negative electrode plate 30 and the positive electrode plate 21 stacked on the separator layer 34. Therefore, the electrode plate pair 40 shown in FIGS. 6 and 7 serves as a unit such that the stacked electrode assembly 20 can be easily formed by stacking the plurality of electrode plate pairs 40. That is, the stacked electrode assembly 20 can be formed by stacking the plurality of electrode plate pairs 40 as shown in FIGS. 8 and 9 and then finally stacking the integrated negative electrode plate 30 on the positive electrode plate 21 located on the outermost side (uppermost side in FIGS. 8 and 9). The battery 1 including the stacked electrode assembly 20 thus formed is simple in structure and low in cost.

Next, a method of manufacturing the integrated negative electrode plate 30, the electrode plate pair 40, and the battery 1 will be described (see FIG. 10 to FIGS. 12A, 12B). First, the positive electrode plate 21 is manufactured by a known method (step S5). That is, the positive electrode active material, the conductive material, and the binder are mixed with a solvent (NMP) to prepare a positive electrode paste. Then, the positive electrode paste is coated on the one-side surface 22c of the positive electrode current collector foil 22 by a die coating method and then dried by heating, thereby forming the positive electrode active material layer 23. Likewise, the positive electrode paste is coated also on the other-side surface 22d of the positive electrode current collector foil 22 and then dried by heating, thereby forming the positive electrode active material layer 23. Thereafter, this positive electrode plate 21 is pressed by pressure rolls to increase the density of the positive electrode active material layers 23. In this way, the positive electrode plate 21 is formed.

Apart from the manufacture of the positive electrode plate 21 described above, an uncut negative electrode plate 71 is manufactured by a known method (step S1). Specifically, the negative electrode active material, the conductive material, and the binder are mixed with a solvent (water) to prepare a negative electrode paste. Then, the negative electrode paste is repeatedly coated on an uncut negative electrode current collector foil 72 by the die coating method and dried, thereby forming uncut negative electrode active material layers 73, 73 on both surfaces of the uncut negative electrode current collector foil 72. The uncut negative electrode plate 71 is pressed by pressure rolls to increase the density of the uncut negative electrode active material layers 73, 73.

At subsequent step S2, uncut separator layers 74, 74 are respectively formed on the uncut negative electrode active material layers 73, 73. Specifically, known porous films each having the three-layer structure of PP/PE/PP and stretched in the stretching direction are prepared. A resin solution in which PVDF as an adhesive is dissolved in NMP is thinly coated on the uncut negative electrode active material layers 73, 73, then the prepared porous films are respectively placed on the uncut negative electrode active material layers 73, 73, and then drying is carried out. In this way, an uncut integrated negative electrode plate 70 is formed such that the uncut separator layers 74, 74 each including the porous film are respectively bonded to the uncut negative electrode active material layers 73, 73 via porous PVDF so as to be integrated together (see FIG. 11A).

Figure 11A:
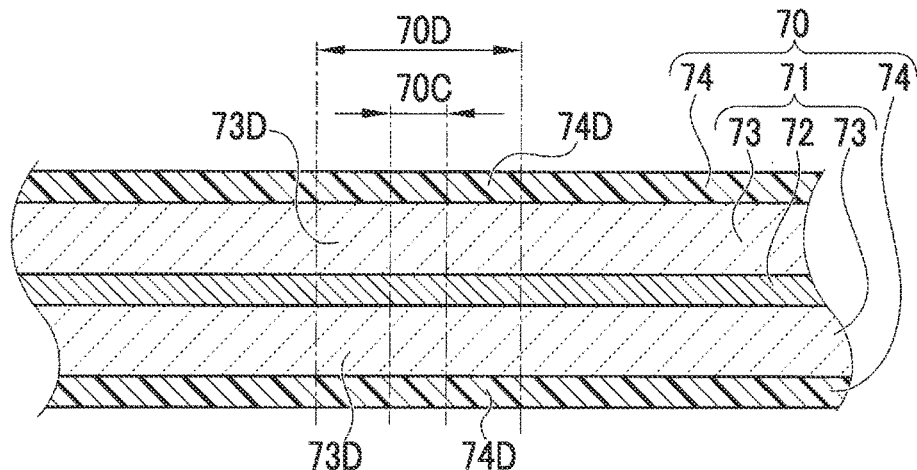
FIG. 11A is a sectional explanatory view showing a manufacturing procedure of the separator-integrated negative electrode plate according to the embodiment, wherein there is shown a state of an uncut integrated electrode plate before a resin permeation step.

As shown in FIG. 11A, a belt-like portion, that will be cut and removed by laser cutting later, of the uncut integrated negative electrode plate 70 will be referred to as a cutting planned portion 70C. A belt-like portion, including the cutting planned portion 70C therein, of the uncut integrated negative electrode plate 70 will be referred to as an uncut permeation region 70D. In this embodiment, the uncut permeation region 70D represents a region that includes the cutting planned portion 70C and that ensures the width Wa, that is more than twice the thickness Ts of the uncut separator layer 74, on both sides of the cutting planned portion 70C. A portion, located in the uncut permeation region 70D, of each uncut negative electrode active material layer 73 will be referred to as an in-region active material portion 73D. A portion, located in the uncut permeation region 70D, of each uncut separator layer 74 will be referred to as an in-region portion 74D.

Figure 11B:
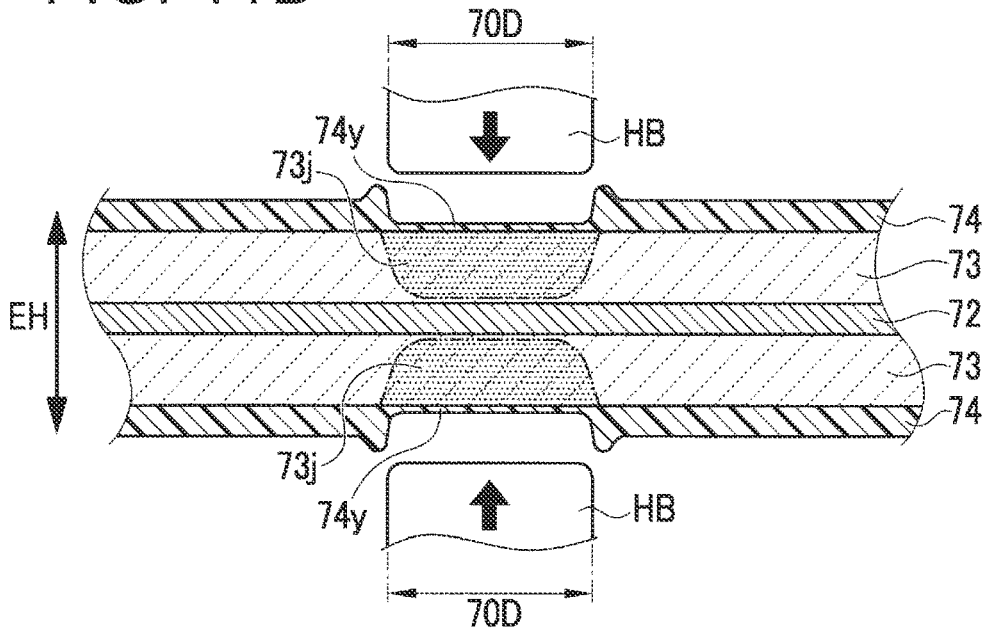
FIG. 11B is a sectional explanatory view showing a manufacturing procedure of the separator-integrated negative electrode plate according to the embodiment, wherein there is shown a state after the resin permeation step in which heating bodies are pressed against uncut resin separator layers.

In a subsequent resin permeation step S3, as shown in FIG. 11B, the hot plates HB heated to a temperature (300° C. in this embodiment) equal to or higher than the melting point of PE (120° C.) and the melting point of PP (168° C.) are pressed against the uncut permeation region 70D of the uncut integrated negative electrode plate 70. Consequently, the in-region portions 74D, 74D of the uncut separator layers 74, 74 are melted to cause the resins to permeate the in-region active material portions 73D, 73D of the uncut negative electrode active material layers 73, 73. In this way, resin-permeated portions 73j, 73j are formed in the in-region active material portions 73D, 73D of the uncut negative electrode active material layers 73, 73. A melt film portion 74y, such that the molten resins are solidified into a film, is formed on an upper portion of each of the resin-permeated portions 73j, 73j. Further, the uncut separator layers 74, 74 are each formed with bulged portions (bulged portions 34b) along the uncut permeation region 70D.

For pressing the hot plates HB to form the resin-permeated portions 73j, 73j as described above, it is preferable to use a pair of heat rollers KR, KR each provided with the hot plates HB at predetermined positions as shown in FIGS. 12A and 12B. That is, the hot plates HB are heated to equal to or higher than the melting points of the resins in advance, and the uncut integrated negative electrode plate 70 is passed through between the heat rollers KR, KR. Consequently, the resin-permeated portions 73j, 73j can be provided in the uncut integrated negative electrode plate 70 continuously and at every predetermined interval.

Figure 11C:
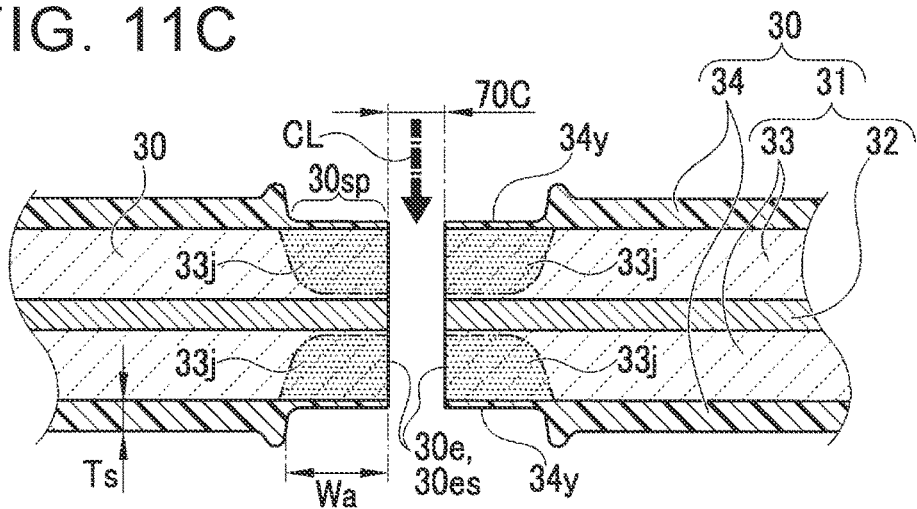
FIG. 11C is a sectional explanatory view showing a manufacturing procedure of the separator-integrated negative electrode plate according to the embodiment, wherein there is shown a state after a post-permeation cutting step in which laser cutting is carried out.

Thereafter, at step S4, as shown in FIG. 11C, a cutting laser beam CL from a fiber laser (wavelength 1.06 µm) is irradiated to the cutting planned portion 70C, thereby cutting the uncut integrated negative electrode plate 70. In this way, the integrated negative electrode plate 30 is manufactured.

According to the manufacturing method of this embodiment, it is possible to reliably manufacture the integrated negative electrode plate 30 that is provided, at the laser-cut end portions 30sp, with wide resin-permeated portions 33j, 33j (corresponding to 33Aj, 33Bj in FIGS. 5 and 7) each having the width Wa that is more than twice the thickness Ts of the separator layer 34 (Wa>2·TS). Further, according to the manufacturing method of the integrated negative electrode plate 30 of this embodiment, the resin permeation step S3 in which the resins are caused to permeate the in-region active material portion 73D, located in the uncut permeation region 70D, of each of the uncut negative electrode active material layers 73 is provided before cutting the uncut integrated negative electrode plate 70 in the post-permeation cutting step S4. The resin-permeated portion 73j permeated with the resins has no gaps or less gaps containing air (oxygen) compared to the state before the permeation of the resins, and therefore, even when the uncut integrated negative electrode plate 70 is laser-cut, burning of the resins permeating the resin-permeated portion 73j is suppressed, thus preventing carbonization of the resins, chipping of the separator layer 34, adhesion of soot, and so on which are otherwise caused by burning of the resins.

Further, according to this manufacturing method, since the hot plate HB is used for melting the resins, the resins forming the uncut separator layer 74 can be melted in a short time and easily. In addition, since the hot plate HB is pressed against the uncut permeation region 70D, the molten resins can be reliably caused to permeate the uncut negative electrode active material layer 73.

Then, at step S6, the integrated negative electrode plate 30 manufactured at step S4 and the positive electrode plate 21 manufactured separately at step S5 are stacked together to manufacture the electrode plate pair 40 (see FIGS. 6 and 7). Specifically, the adhesive is thinly coated on the one-side separator layer 34A of the integrated negative electrode plate 30, then the other-side positive electrode active material layer 23B of the positive electrode plate 21 is placed thereon, and then drying is carried out, so that the positive electrode plate 21 is bonded to and stacked on the integrated negative electrode plate 30 via porous PVDF. In this way, the electrode plate pair 40 is formed.

Then, at step S7, the electrode assembly 20 (see FIGS. 3, 8, and 9) is manufactured using the plurality of electrode plate pairs 40 manufactured at step S6 and the single integrated negative electrode plate 30. Specifically, the electrode assembly 20 is formed by stacking the plurality of electrode plate pairs 40 together and further stacking the integrated negative electrode plate 30 from the one side EH1 on the electrode plate pair 40, located farthest on the one side EH1 in the stacking direction EH, among the electrode plate pairs 40.

Then, using the electrode assembly 20, the battery 1 is manufactured by a known method. Specifically, the positive electrode terminal member 50 and the negative electrode terminal member 60 are fixed to the case lid member 13 (see FIG. 2). Then, the positive electrode current collecting portions 21$m$ of the positive electrode plates 21 of the electrode assembly 20 are bundled together and welded to the positive electrode terminal member 50. Further, the negative electrode current collecting portions 31$m$ of the negative electrode plates 31 of the electrode assembly 20 are bundled together and welded to the negative electrode terminal member 60. Thereafter, the electrode assembly 20 is inserted into the case body member 11, and an opening 11$h$ of the case body member 11 is closed by the case lid member 13. Then, the case body member 11 and the case lid member 13 are laser-welded to each other to form the battery case 10. Further, the nonaqueous electrolyte solution 19 is poured into the battery case 10 from a pouring hole 13$h$, provided in the case lid member 13, so as to be impregnated into the electrode assembly 20, and then the pouring hole 13$h$ is sealed with a sealing member 15, so that the battery 1 is completed.

First Modification

In the above-described embodiment, when manufacturing the integrated negative electrode plate 30, as shown in FIG. 11B, the hot plates HB, HB are pressed against the uncut permeation region 70D of the uncut integrated negative electrode plate 70 to form the resin-permeated portions 73$j$, 73$j$ in the in-region active material portions 73D, 73D of the uncut negative electrode active material layers 73, 73 in the resin permeation step S3.

Figure 13A:
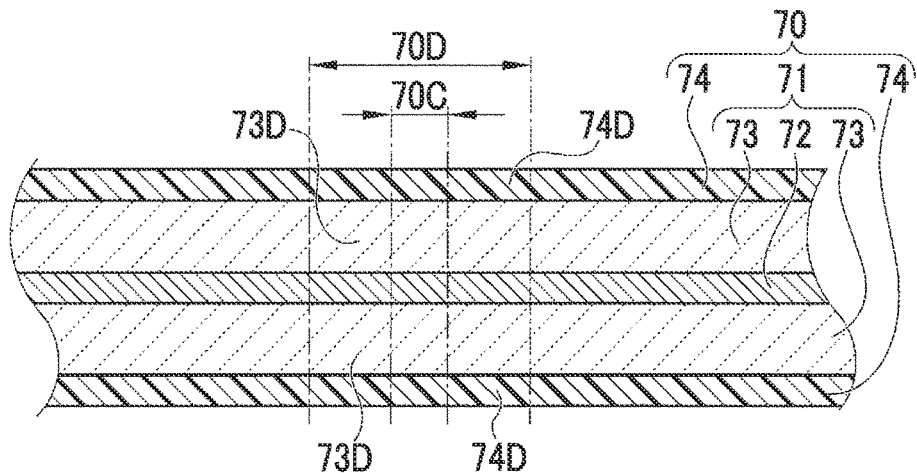
FIG. 13A is a sectional explanatory view showing a manufacturing procedure of a separator-integrated negative electrode plate according to a first modification, wherein there is shown a state of an uncut integrated electrode plate before a resin permeation step.
Figure 13B:
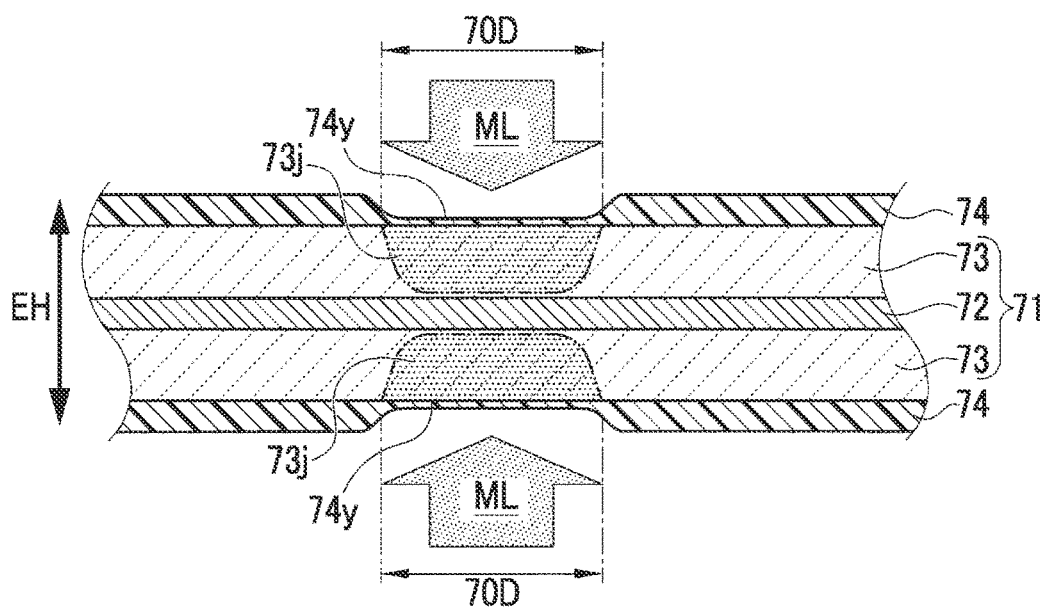
FIG. 13B is a sectional explanatory view showing a manufacturing procedure of the separator-integrated negative electrode plate according to the first modification, wherein there is shown a state after the resin permeation step in which melting laser beams are irradiated to melt uncut resin separator layers.

On the other hand, in this first modification, when manufacturing an integrated negative electrode plate 30, resin-permeated portions 73$j$, 73$j$ are formed in a non-contact manner using laser beams. Specifically, first, as shown in FIG. 13A, there is prepared an uncut integrated negative electrode plate 70 like the one shown in FIG. 11A in the embodiment. In a resin permeation step S3$a$ (see FIG. 10), as shown in FIG. 13B, melting laser beams ML, ML are irradiated from both sides to a belt-like uncut permeation region 70D, including a cutting planned portion 70C therein, of the uncut integrated negative electrode plate 70 to melt in-region portions 74D, 74D of uncut separator layers 74, 74, thereby causing resins of the in-region portions 74D, 74D to permeate in-region active material portions 73D, 73D of uncut negative electrode active material layers 73, 73.

Even by this manufacturing method, it is possible to manufacture the integrated negative electrode plate 30 that is provided, at laser-cut end portions 30*sp*, with wide resin-permeated portions 33$j$, 33$j$ each having a width Wa that is more than twice a thickness Ts of a separator layer 34. That is, it is possible to reliably manufacture the integrated negative electrode plate 30 in which a failure such that the separator layer 34 on a negative electrode active material layer 33 turns up from a laser-cut edge 30*es* is unlikely to occur.

As the melting laser beam ML, use is made of a $CO_2$ laser (wavelength 10.6 μm) that emits an infrared beam which is efficiently absorbed by a resin such as PE or PP, and the beam shape is adjusted such that its spot diameter becomes substantially equal to the width of the uncut permeation region 70D. Other than this, a fiber laser (wavelength 1.06 μm) may be irradiated to the uncut permeation region 70D to heat the in-region active material portions 73D, 73D of the uncut negative electrode active material layers 73, 73, thereby indirectly melting the in-region portions 74D, 74D of the uncut separator layers 74, 74. Alternatively, infrared light, microwave, or the like may be irradiated to melt the resins of the in-region portions 74D, 74D, thereby causing the resins to permeate the in-region active material portions 73D, 73D.

In this way, the resin-permeated portions 73$j$, 73$j$ are formed in the in-region active material portions 73D, 73D of the uncut negative electrode active material layers 73, 73. A melt film portion 74$y$, such that the molten resins are solidified into a film, is formed on an upper portion of each of the resin-permeated portions 73$j$, 73$j$. However, differently from the embodiment, no bulged portion 34$b$ is formed along the uncut permeation region 70D.

Figure 13C:
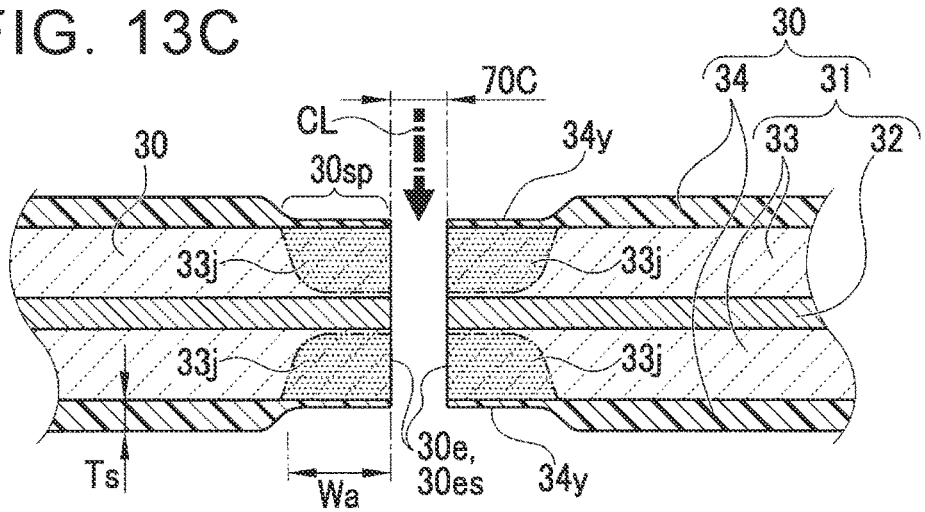
FIG. 13C is a sectional explanatory view showing a manufacturing procedure of the separator-integrated negative electrode plate according to the first modification, wherein there is shown a state after a post-permeation cutting step in which laser cutting is carried out.

Thereafter, at step S4, as shown in FIG. 13C, a cutting laser beam CL from a fiber laser (wavelength 1.06 μm) is irradiated to the cutting planned portion 70C from one direction (from above in FIG. 13C in the first modification), thereby cutting the uncut integrated negative electrode plate 70. In this way, the integrated negative electrode plate 30 is manufactured. Using this, it is possible to manufacture an electrode plate pair 40 (step S6), an electrode assembly 20 (step S7), and a battery 1 (step S8).

Second Modification

In the above-described embodiment and first modification, the uncut integrated negative electrode plate 70 formed with the resin-permeated portions 73$j$, 73$j$ is first manufactured using the hot plates HB, HB or the melting laser beams ML, ML (resin permeation step S3, S3$a$), and then the uncut integrated negative electrode plate 70 is cut using the cutting laser beam CL (post-permeation cutting step S4), thereby manufacturing the integrated negative electrode plate 30.

Figure 14:
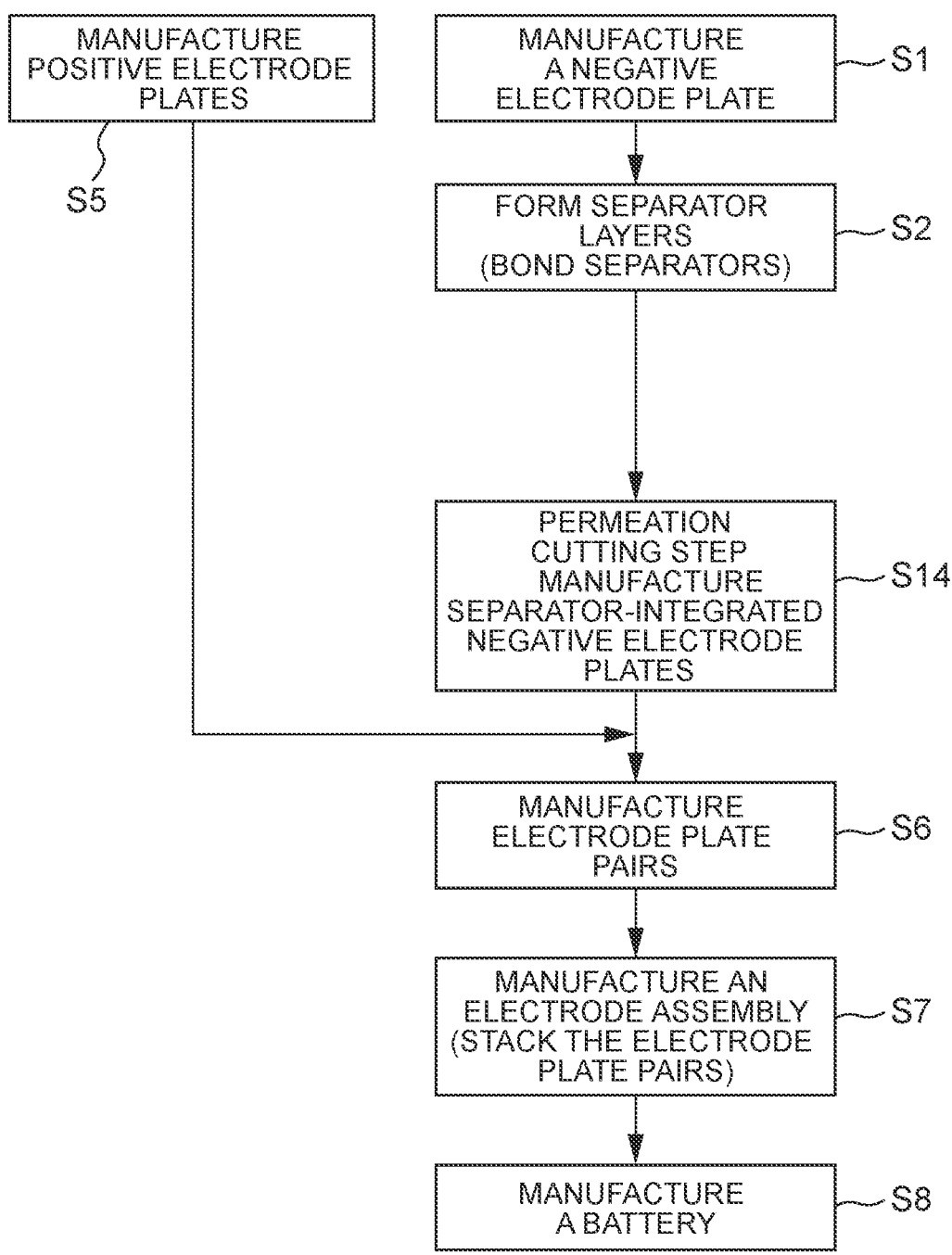
FIG. 14 is a flowchart showing manufacturing processes of a separator-integrated negative electrode plate, an electrode plate pair, and a battery according to a second modification.
Figure 15A:
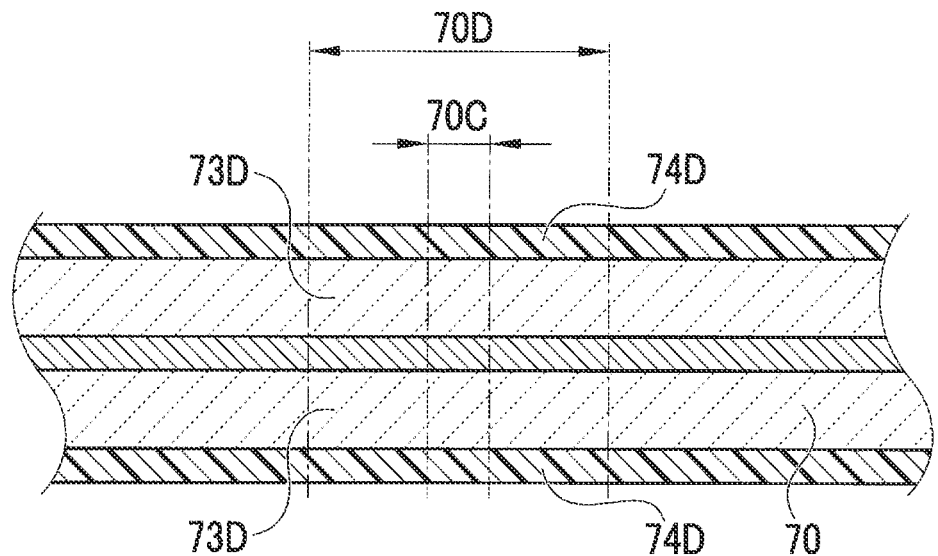
FIG. 15A is a sectional explanatory view showing a manufacturing procedure of the separator-integrated negative electrode plate according to the second modification, wherein there is shown a state of an uncut integrated electrode plate before a permeation cutting step.
Figure 15B:
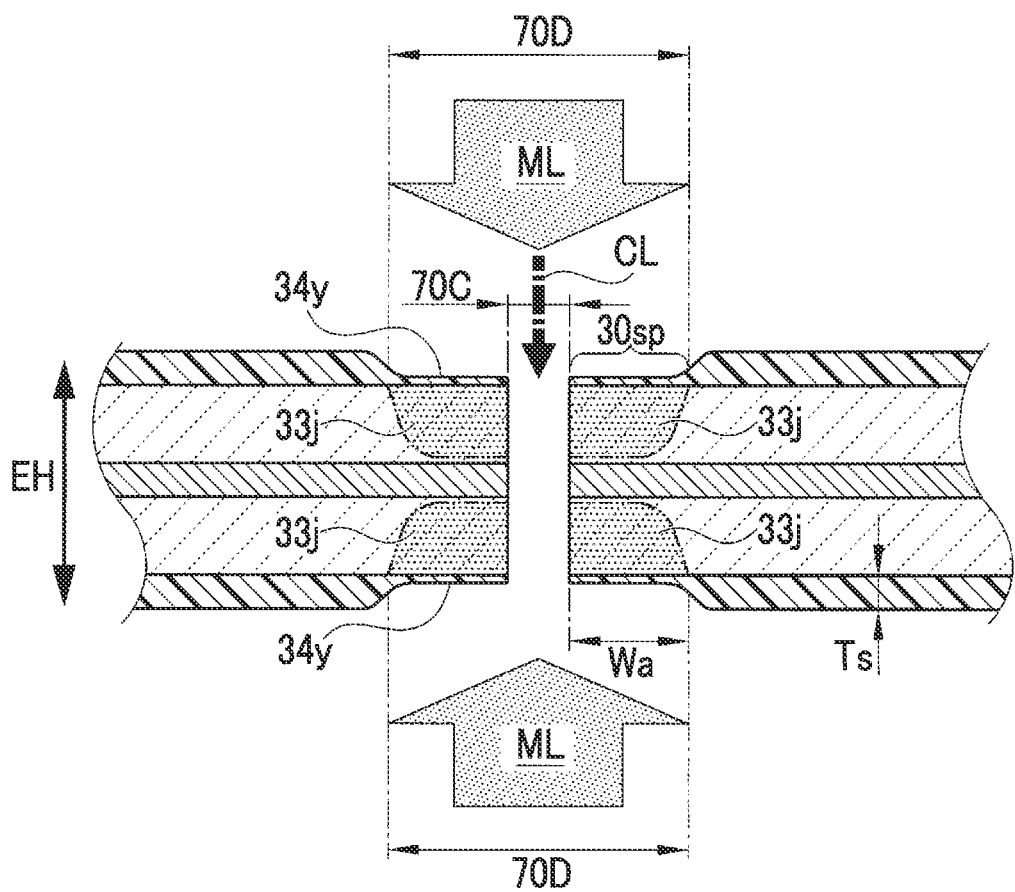
FIG. 15B is a sectional explanatory view showing a manufacturing procedure of the separator-integrated negative electrode plate according to the second modification, wherein there is shown a state after the permeation cutting step in which melting laser beams are irradiated to melt uncut resin separator layers and simultaneously laser cutting is carried out.
Figure 16:
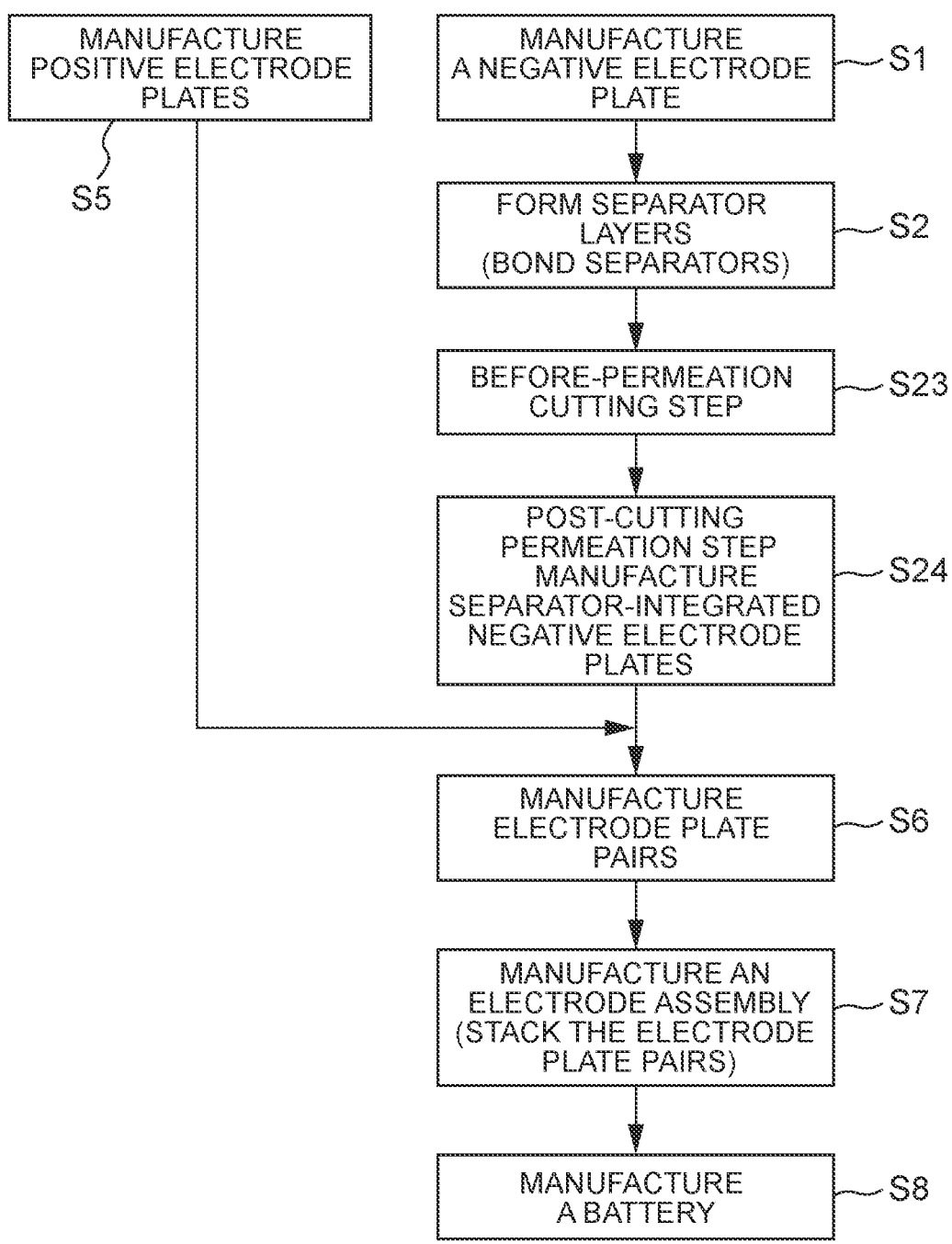
FIG. 16 is a flowchart showing manufacturing processes of a separator-integrated negative electrode plate, an electrode plate pair, and a battery according to a third modification.

On the other hand, in this second modification, when manufacturing an integrated negative electrode plate 30, resin-permeated portions 73$j$, 73$j$ (resin-permeated portions 33$j$, 33$j$) are formed in an uncut integrated negative electrode plate 70, and simultaneously, cutting of the uncut integrated negative electrode plate 70 is carried out (see FIG. 14 and FIGS. 15A, 15B). Specifically, in a permeation cutting step S14, first, as shown in FIG. 15A, there is prepared an uncut integrated negative electrode plate 70 like the one shown in FIG. 11A in the embodiment. In the permeation cutting step S14, as shown in FIG. 15B, melting laser beams ML, ML are irradiated from both sides to a belt-like uncut permeation region 70D, including a cutting planned portion 70C therein, of the uncut integrated negative electrode plate 70 to melt in-region portions 74D, 74D of uncut separator layers 74, 74, thereby causing resins of the in-region portions 74D, 74D to permeate in-region active material portions 73D, 73D of uncut negative electrode active material layers 73, 73.

In addition, simultaneously with this, a cutting laser beam CL from a fiber laser (wavelength 1.06 μm) is irradiated to the cutting planned portion 70C from one direction (from above in FIG. 15B in the second modification), thereby cutting the uncut integrated negative electrode plate 70. In this way, the integrated negative electrode plate 30 is manufactured. In order to prevent optical axes of the laser beams ML, ML, and CL from coinciding with each other, it is preferable to irradiate the laser beams ML, ML, and CL such that their optical axes are inclined at different angles with respect to the uncut integrated negative electrode plate 70.

Even by this manufacturing method, it is possible to manufacture the integrated negative electrode plate 30 that is provided, at laser-cut end portions 30sp, with wide resin-permeated portions 33j, 33j each having a width Wa that is more than twice a thickness Ts of a separator layer 34. That is, it is possible to reliably manufacture the integrated negative electrode plate 30 in which a failure such that the separator layer 34 on a negative electrode active material layer 33 turns up from a laser-cut edge 30es is unlikely to occur.

Further, according to this manufacturing method, in the permeation cutting step S14, the resins forming the in-region portions 74D, 74D of the uncut separator layers 74, 74 are melted to permeate the in-region active material portions 73D, 73D of the uncut negative electrode active material layers 73, 73, and simultaneously, the uncut integrated negative electrode plate 70 is cut, so that the step can be completed in a short time.

In the above-described second modification, the example is given in which the $CO_2$ laser is used as the light source of the melting laser beam ML, while the fiber laser is used as the light source of the cutting laser beam CL. However, a laser beam of a fiber laser may be split into a melting laser beam ML and a cutting laser beam CL using a beam splitter, thereby heating the uncut negative electrode active material layer 73 using the melting laser beam ML to melt the resins of the in-region portion 74D by that heat and cutting the uncut integrated negative electrode plate 70 using the cutting laser beam CL.

Thereafter, like in the embodiment and the first modification, using the integrated negative electrode plate 30, it is possible to manufacture an electrode plate pair 40 (step S6), an electrode assembly 20 (step S7), and a battery 1 (step S8).

Third Modification

In the above-described embodiment and first modification, the uncut integrated negative electrode plate 70 formed with the resin-permeated portions 73j, 73j is first manufactured (resin permeation step S3, S3a), and then the uncut integrated negative electrode plate 70 is cut (post-permeation cutting step S4), thereby manufacturing the integrated negative electrode plate 30. In the second modification, the uncut integrated negative electrode plate 70 is formed with the resin-permeated portions 73j, 73j and is simultaneously cut (permeation cutting step S14), thereby manufacturing the integrated negative electrode plate 30.

Figure 17A:
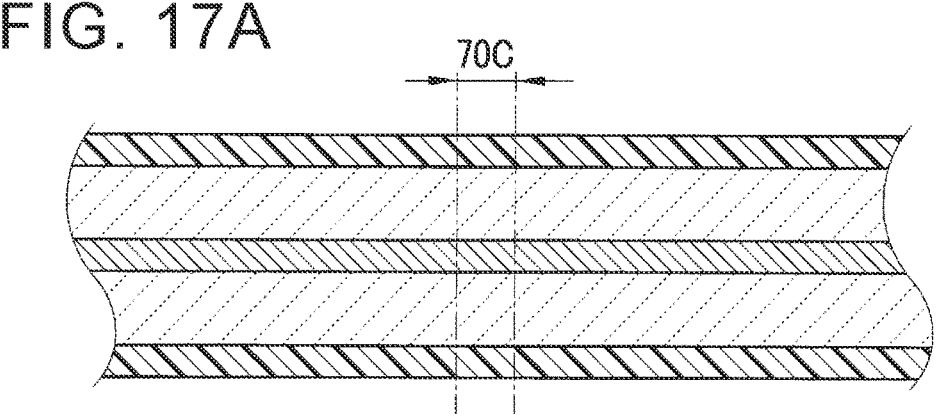
FIG. 17A is a sectional explanatory view showing a manufacturing procedure of the separator-integrated negative electrode plate according to the third modification, wherein there is shown a state of an uncut integrated electrode plate before a before-permeation cutting step.
Figure 17B:
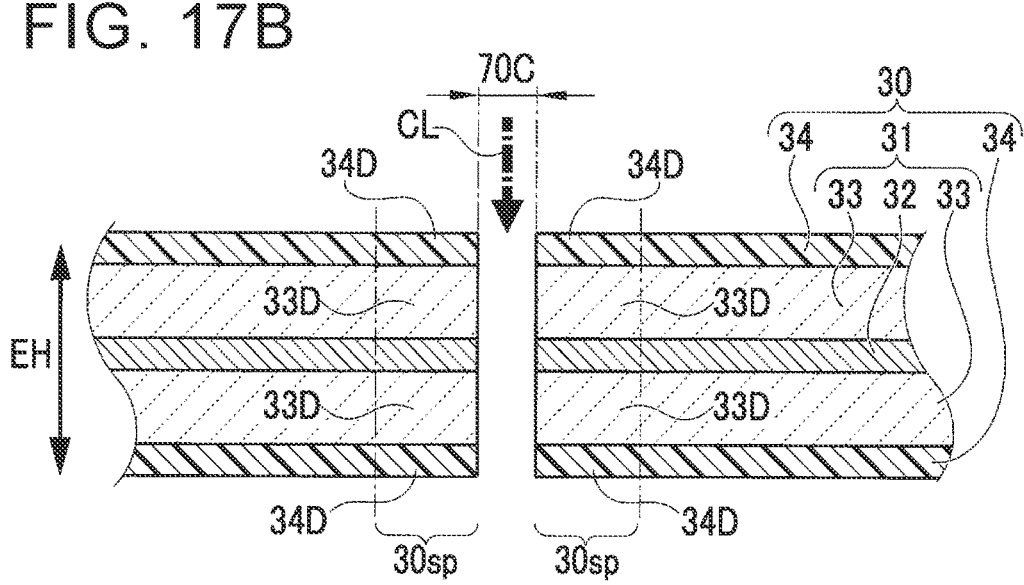
FIG. 17B is a sectional explanatory view showing a manufacturing procedure of the separator-integrated negative electrode plate according to the third modification, wherein there is shown a state after the before-permeation cutting step in which laser cutting is carried out.

On the other hand, in this third modification, when manufacturing an integrated negative electrode plate 30, an uncut integrated negative electrode plate 70 is first cut, and then resin-permeated portions 33j, 33j are formed in integrated negative electrode plates 30 (see FIG. 16 and FIGS. 17A, 17B, 17C). Specifically, first, as shown in FIG. 17A, there is prepared an uncut integrated negative electrode plate 70 like the one shown in FIG. 11A in the embodiment. As shown in FIG. 17B, in a before-permeation cutting step S23, a cutting laser beam CL from a fiber laser (wavelength 1.06 μm) is irradiated to a cutting planned portion 70C from one direction (from above in FIG. 17B in this third modification), thereby cutting the uncut integrated negative electrode plate 70. In this way, integrated negative electrode plates 30 formed with no resin-permeated portion 33j are manufactured.

Figure 17C:
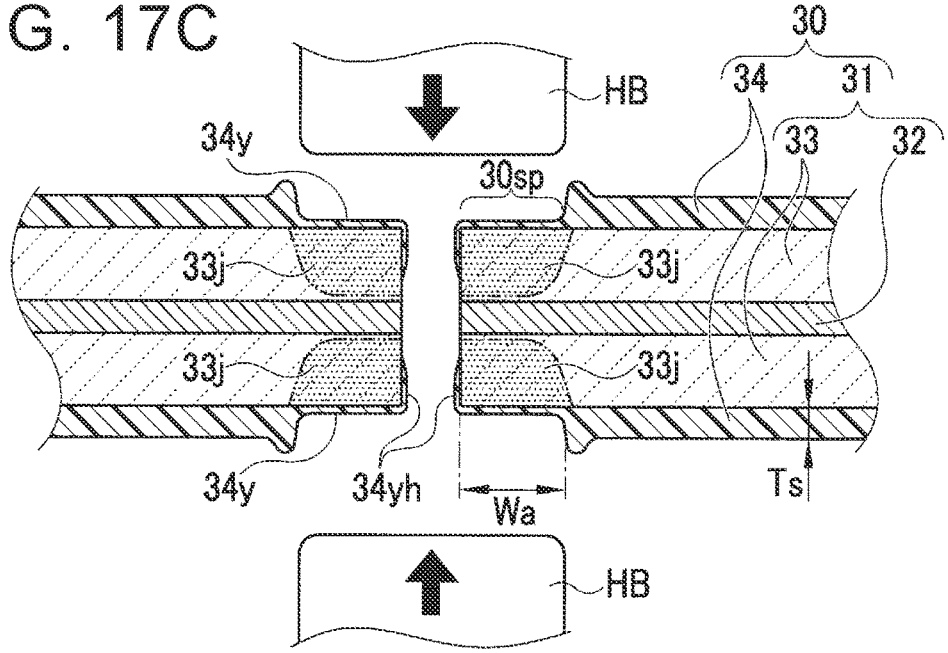
FIG. 17C is a sectional explanatory view showing a manufacturing procedure of the separator-integrated negative electrode plate according to the third modification, wherein there is shown a state after a post-cutting permeation step in which heating bodies are pressed against resin separator layers after the laser cutting.
Figure 18:
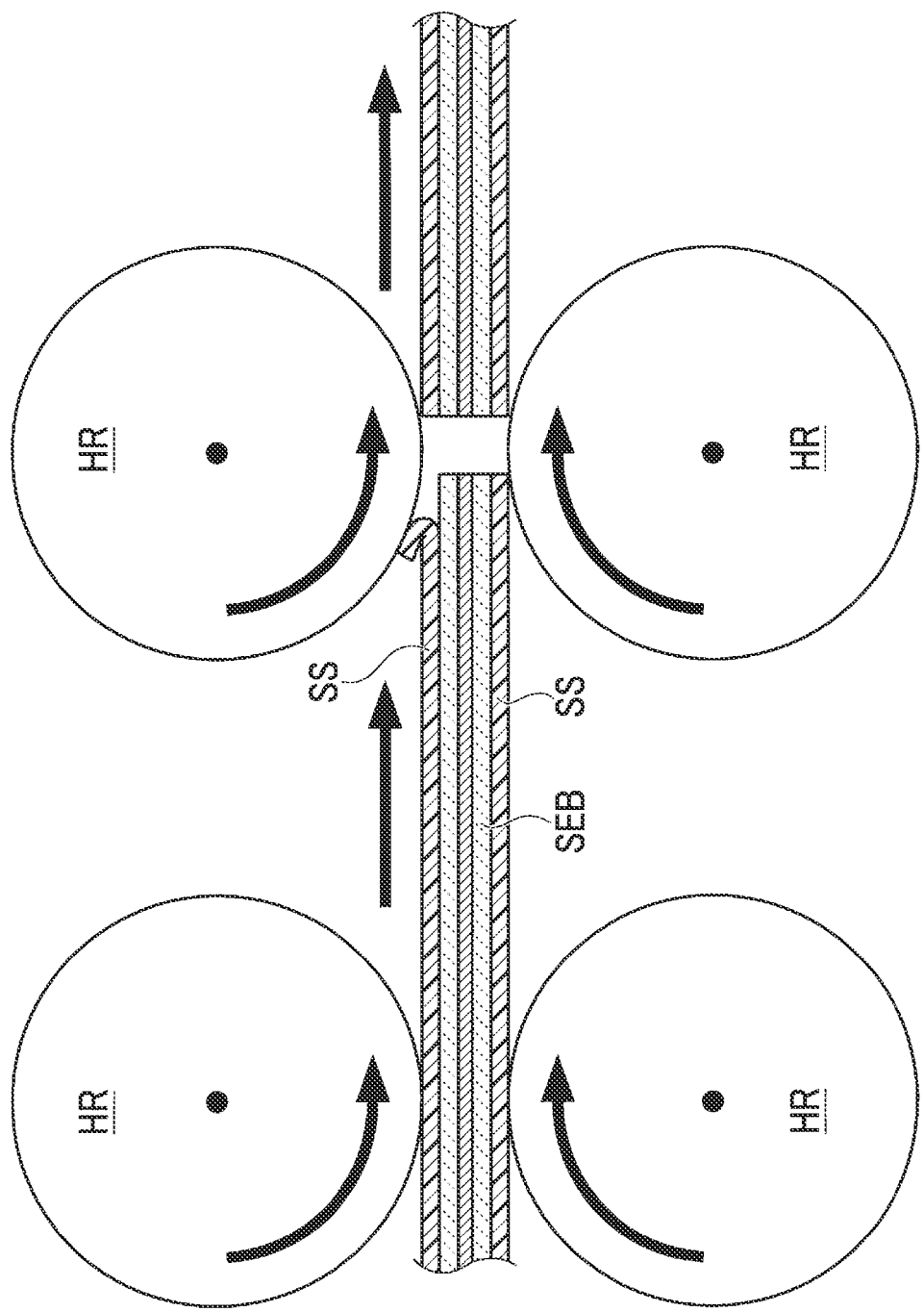
FIG. 18 is an explanatory diagram showing a state of a failure that occurs on a resin separator layer when a separator-integrated electrode plate of a related art is conveyed by rollers.

Thereafter, as shown in FIG. 17C, hot plates HB heated to a temperature (300° C. in this third modification) equal to or higher than the melting points of PE and PP are pressed from both sides against belt-like laser-cut end portions 30sp along laser-cut edges 30es of the integrated negative electrode plates 30. Consequently, melting regions 34D, 34D, at the laser-cut end portion 30sp, of separator layers 34, 34 of each of the integrated negative electrode plates 30 are melted, thereby causing resins of the melting regions 34D, 34D to permeate permeation regions 33D, 33D of negative electrode active material layers 33, 33. In this way, resin-permeated portions 33j, 33j are formed in the permeation regions 33D, 33D of the negative electrode active material layers 33, 33. A melt film portion 34y and an end melt film portion 34yh, such that the molten resins are solidified into a film, are respectively formed on an upper portion and an end face of each of the resin-permeated portions 33j, 33j.

For pressing the hot plates HB to form the resin-permeated portions 33j, 33j as described above, it is preferable to use, like in the embodiment, a pair of heat rollers KR, KR each provided with the hot plates HB at predetermined positions (see FIGS. 12A, 12B).

Even by this manufacturing method, it is possible to manufacture the integrated negative electrode plate 30 that is provided, at the laser-cut end portions 30sp, with the wide resin-permeated portions 33j, 33j each having a width Wa that is more than twice a thickness Ts of the separator layer 34. That is, it is possible to reliably manufacture the integrated negative electrode plate 30 in which a failure such that the separator layer 34 on the negative electrode active material layer 33 turns up from the laser-cut edge 30es is unlikely to occur.

FIG. 17C shows the state where the resin-permeated portions 33j, 33j are formed in the two integrated negative electrode plates 30 after the cutting. However, the resin-permeated portions 33j, 33j may be formed in each of the integrated negative electrode plates 30 after the cutting, independently. Instead of using the hot plates HB, HB, melting laser beams ML, ML may be used to melt the melting regions 34D, 34D, at the laser-cut end portion 30sp, of the separator layers 34, 34, thereby causing the resins of the melting regions 34D, 34D to permeate the permeation regions 33D, 33D of the negative electrode active material layers 33, 33.

While the disclosure has been described with reference to the embodiment and the first to third modifications, it is needless to say that the disclosure is not limited to the above-described embodiment and so on and can be applied with various changes as appropriate within a range not departing from the gist thereof. In the above-described embodiment and so on, the integrated negative electrode plate 30 is configured such that the separator layer 34 including the porous film is bonded to the negative electrode plate 31. However, instead of the porous film, resin particles such as PE particles may be deposited on a negative electrode active material layer 33 and used as a resin separator layer. Alternatively, a polyimide layer may be provided on a negative electrode active material layer 33, and resin particles may be deposited on the polyimide layer, thereby providing a resin separator layer including the polyimide layer and a deposited layer of the resin particles. Also in these cases, by providing a resin-permeated portion 33j, it is possible to suppress the occurrence of a failure such as chipping of the resin separator layer near a laser-cut edge 30es.

In the above-described embodiment and so on, the integrated negative electrode plate 30 configured such that the separator layer 34 is integrated with the negative electrode plate 31 is shown by way of example. However, the disclosure may be applied to an integrated positive electrode plate configured such that a separator layer is integrated with a positive electrode plate, thereby providing a resin-permeated portion having the width Wa at a laser-cut end portion. In the case of a bipolar electric power storage element, the disclosure may be applied to a separator-integrated electrode plate configured such that resin separator layers are respectively provided on both surfaces of an electrode plate having a positive electrode active material layer on one surface of a current collector plate and a negative electrode active material layer on the other surface of the current collector plate, thereby providing resin-permeated portions each having the width Wa at a laser-cut end portion.

What is claimed is:

1. A separator-integrated electrode plate comprising:
    a current collector plate;
    an active material layer formed on the current collector plate;
    a resin separator layer formed on the active material layer;
    a melt film portion; and
    an end melt film portion,
    wherein a belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer; and
    wherein the resin solidifies into the melt film portion on an upper portion of the resin-permeated portion and the end melt film portion on an end face of the resin-permeated portion.

2. The separator-integrated electrode plate according to claim 1, wherein
    the resin separator layer includes a stretched porous resin film and is bonded to the active material layer.

3. The separator-integrated electrode plate according to claim 1, wherein
    the active material layer and the resin separator layer are provided on each of both surfaces of the current collector plate.

4. An electrode plate pair comprising:
    the separator-integrated electrode plate according to claim 3;
    a second current collector plate; and
    a pair of second active material layers respectively formed on both surfaces of the second current collector plate,
    wherein a second electrode plate is stacked such that one of the second active material layers is placed on one of the resin separator layers of the separator-integrated electrode plate.

5. A stacked electric power storage element comprising
    a stacked electrode assembly configured such that a plurality of electrode plate pairs each according to claim 4 are stacked together.

6. A method of manufacturing a separator-integrated electrode plate, the separator-integrated electrode plate including: a current collector plate; an active material layer formed on the current collector plate; a resin separator layer formed on the active material layer; a melt film portion; and an end melt film portion, wherein a belt-like laser-cut end portion along a laser-cut edge that is laser-cut in a thickness direction of the separator-integrated electrode plate and forms part of a peripheral edge of the separator-integrated electrode plate has a resin-permeated portion in which a resin forming the resin separator layer permeates the active material layer over a width that is more than twice a thickness of the resin separator layer, the method comprising: a before-permeation cutting step in which an uncut integrated electrode plate including an uncut current collector plate, an uncut active material layer formed on the uncut current collector plate, and an uncut resin separator layer formed on the uncut active material layer is laser-cut; and
    a post-cutting permeation step in which thermal energy is applied to the laser-cut end portion to melt the resin forming the resin separator layer, the resin is caused to permeate the active material layer, such that the resin-permeated portion having the width is formed along the laser-cut edge generated by the laser cutting, wherein the resin solidifies into the melt film portion on an upper portion of the resin-permeated portion and the end melt film portion on an end face of the resin-permeated portion.

* * * * *